United States Patent
Griffais

(10) Patent No.: US 12,357,908 B2
(45) Date of Patent: Jul. 15, 2025

(54) TRACKING FILE SYSTEM READ OPERATIONS FOR INSTANT PLAY OF VIDEO GAMES, AND FOR CLIENT-SIDE DISCARDING AND PREFETCHING OF GAME DATA

(71) Applicant: Valve Corporation, Bellevue, WA (US)

(72) Inventor: Pierre-Loup Miguel Griffais, Mercer Island, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 18/482,291

(22) Filed: Oct. 6, 2023

(65) Prior Publication Data

US 2024/0033623 A1 Feb. 1, 2024

Related U.S. Application Data

(63) Continuation of application No. 17/458,054, filed on Aug. 26, 2021, now Pat. No. 11,813,520, which is a
(Continued)

(51) Int. Cl.
*A63F 13/352* (2014.01)
*A63F 13/335* (2014.01)

(52) U.S. Cl.
CPC .......... *A63F 13/352* (2014.09); *A63F 13/335* (2014.09); *A63F 2300/534* (2013.01)

(58) Field of Classification Search
None
See application file for complete search history.

(56) References Cited

U.S. PATENT DOCUMENTS 6,571,282 B1 5/2003 Bowman-Amuah
9,969,856 B2 * 5/2018 Menashi ................ C08J 9/0066
(Continued)

FOREIGN PATENT DOCUMENTS

EP 0681298 A2 11/1995
EP 2621594 B1 8/2016

OTHER PUBLICATIONS

European Search Report mailed Jan. 19, 2024 for European Application No. 21770759.5, a foreign counterpart to U.S. Pat. No. 11,123,634, 15 pages.
(Continued)

*Primary Examiner* — Ronald Laneau
(74) *Attorney, Agent, or Firm* — Lee & Hayes, P.C.

(57) ABSTRACT

Client machines running game executables of a video game(s) may utilize a file system proxy component that is configured to track read operations made by the game executable during a game session, to generate access data based on the tracked read operations, and to report the access data to a remote system. This telemetry approach allows the remote system to collect access data reported by multiple client machines, to catalogue the access data according to client system configuration, and to analyze the access data to generate data that is usable by client machines to implement various game-related features including, without limitation, "instant play" of video games, discarding of unused blocks of game data to free up local memory resources, and/or local prefetching of game data for reducing latency during gameplay.

20 Claims, 8 Drawing Sheets

Related U.S. Application Data continuation of application No. 16/821,716, filed on Mar. 17, 2020, now Pat. No. 11,123,634.

(56) References Cited

U.S. PATENT DOCUMENTS

| | | | |
|---|---|---|---|
| 10,569,164 B1 | 2/2020 | Bleasdale-Shepherd | |
| 11,123,634 B1 | 9/2021 | Griffais | |
| 11,508,125 B1 | 11/2022 | Latta et al. | |
| 2005/0193139 A1 | 9/2005 | Vinson et al. | |
| 2007/0010329 A1* | 1/2007 | Craig | A63F 13/355 463/42 |
| 2009/0054140 A1 | 2/2009 | Beser et al. | |
| 2009/0164754 A1 | 6/2009 | Cheriton | |
| 2009/0233705 A1 | 9/2009 | Lemay | |
| 2010/0255909 A1 | 10/2010 | McNamara | |
| 2011/0077086 A1* | 3/2011 | Grube | A63F 13/30 463/43 |
| 2011/0145362 A1 | 6/2011 | Jones et al. | |
| 2012/0110347 A1 | 5/2012 | Bigelow, Jr. et al. | |
| 2012/0192171 A1 | 7/2012 | Tanaka et al. | |
| 2012/0322563 A1 | 12/2012 | Nguyen | |
| 2014/0129665 A1 | 5/2014 | Chan | |
| 2014/0179441 A1 | 6/2014 | Morrison, III | |
| 2014/0344283 A1 | 11/2014 | Nicholls | |
| 2019/0168124 A1 | 6/2019 | Haile et al. | |
| 2020/0188793 A1 | 6/2020 | Haile et al. | |
| 2021/0291049 A1 | 9/2021 | Griffais | |
| 2021/0387086 A1 | 12/2021 | Griffais | |
| 2023/0044756 A1* | 2/2023 | Poe | H04L 67/1074 |

OTHER PUBLICATIONS

Wikipedia, "Internet Download Manager", retrieved from <<https://en.wikipedia.org/w/index.php?title=Internet_Download_Manager&oldid=938930872>>, Feb. 3, 2020. pp. 1-2.

Boutilier, "Video game companies are collecting massive amounts of data about you", Toronto Star Newspapers, Dec. 29, 2015, 3 pages, retrieved on May 20, 2021 from <<https://www.thestar.com/news/canada/2015/12/29/how-much-data-are-video-games-collecting-about-you.html>>.

Office Action for U.S. Appl. No. 17/458,054, mailed on Mar. 21, 2023, Inventor #1 Pierre-Loup Miguel Griffais, "Tracking File System Read Operations for Instant Play of Video Games, and for Client-Side Discarding and Prefetching of Game Data," 7 pages.

PCT Search Report mailed Jun. 11, 2021 for PCT Application No. PCT/US21/22815, 10 pages.

Extended European Search Report mailed Apr. 19, 2024 for European Application No. 21770759.5, a foreign counterpart to U.S. Pat. No. 11,123,634, 17 pages.

\* cited by examiner

TRACKING FILE SYSTEM READ OPERATIONS FOR INSTANT PLAY OF VIDEO GAMES, AND FOR CLIENT-SIDE DISCARDING AND PREFETCHING OF GAME DATA

CROSS REFERENCE TO RELATED APPLICATION

This U.S. patent application is a continuation of and claims priority to co-pending and commonly assigned U.S. patent application Ser. No. 17/458,054, entitled "TRACKING FILE SYSTEM READ OPERATIONS FOR INSTANT PLAY OF VIDEO GAMES, AND FOR CLIENT-SIDE DISCARDING AND PREFETCHING OF GAME DATA," and filed on Aug. 26, 2021, which is a continuation of and claims priority to U.S. patent application Ser. No. 16/821,716, entitled "TRACKING FILE SYSTEM READ OPERATIONS FOR INSTANT PLAY OF VIDEO GAMES, AND FOR CLIENT-SIDE DISCARDING AND PREFETCHING OF GAME DATA," and filed on Mar. 17, 2020, the entirety of each of which is incorporated herein by reference.

BACKGROUND

A service for the distribution of personal computer (PC) video games may utilize a network-accessible computing platform to distribute digital copies of video games to PCs. For example, a user can purchase a video game made available via the distribution service, and the video game can be downloaded to the user's PC from a remote computing system over the Internet. Many of today's video games are relatively large, and as a result, it may take a significant amount of time to download a video game, and it may also take a significant amount of disk storage on the PC to store all of the game data for the video game once it is downloaded on the user's PC. For example, a video game can include over 100 Gigabytes (GB) of game data, and this can take several hours to download using existing technology, depending on the download speed of the user's network connection. Unless a developer of the video game writes the game code in such as way that the video game is playable with some, but not all, of the game data downloaded to the PC, a user must wait to play the game until the game download has finished. Furthermore, because most games are so large, users often choose to store the game on a hard disk drive (HDD) that provides the most storage space on the PC. However, despite the current availability of high-capacity HDDs, local storage capacity is still limited, and because HDDs provide relatively slow read access speeds, latency can arise at times when the PC is loading the game data from the HDD during a game session.

Provided herein are technical solutions to improve and enhance these and other systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
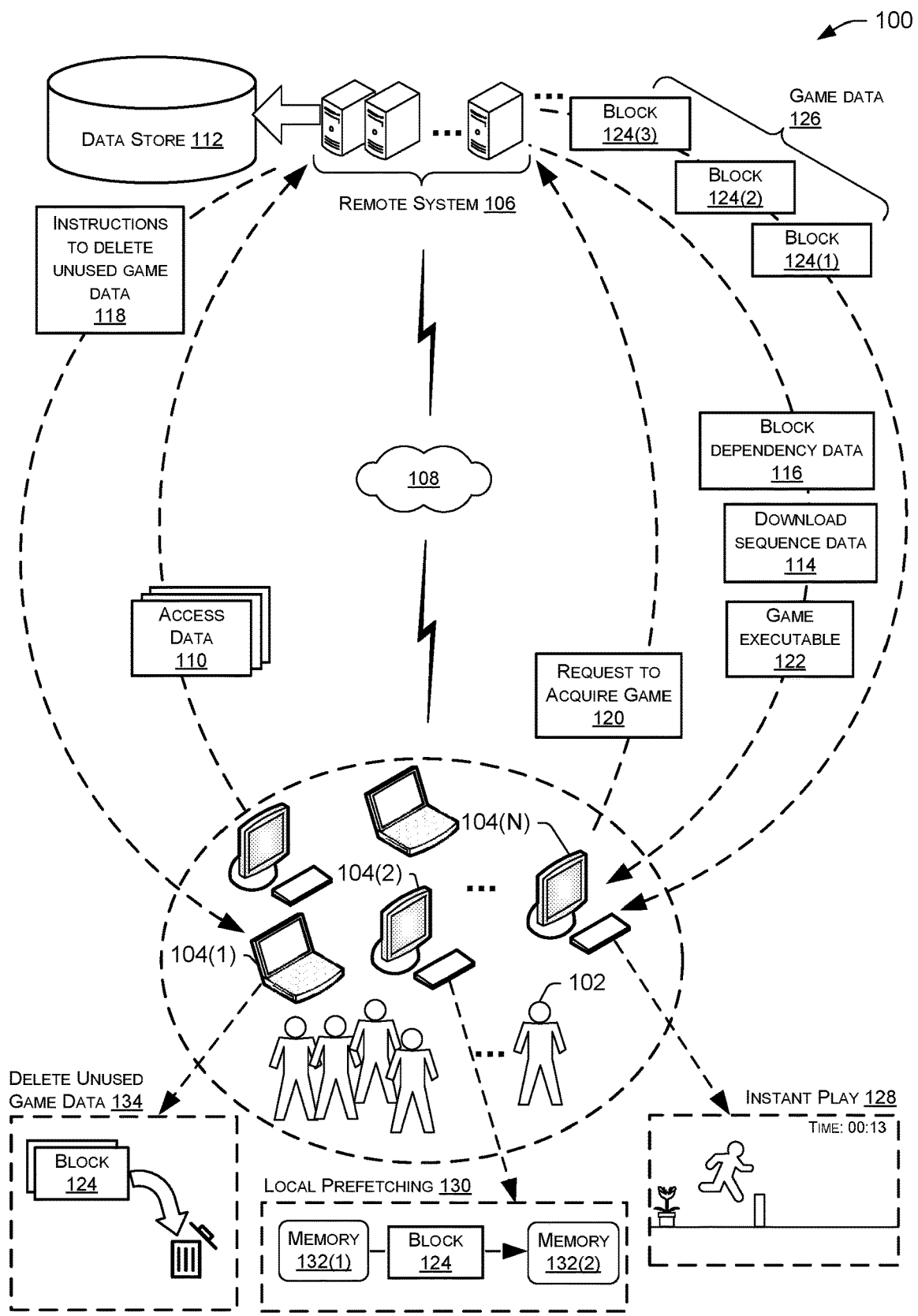
FIG. 1 is a diagram illustrating an example environment that includes a video game distribution platform configured to implement the techniques described herein.

A video game distribution platform may allow users to acquire video games, download digital copies of the video games to their respective client machines, and execute the video games using an installed client application. As the users play a video game on their client machines, game executables of the video game running on each client machine may continually request to read blocks of game data for the video game using the files systems of the client machines. A "game executable," as used herein, means executable code (e.g., one or more executable files) of a video game that, when executed, allow a user to play the video game on a client machine by rendering frames based on user input provided via an input device(s) of the client machine. "Game data," as used herein, means data that is read by the game executable during execution of the game executable for the video game over a series of frames. Game data can be used for, among other things, rendering the graphics for the video game, computing gameplay logic, and/or computing the physics for the video game. Examples of game data include, without limitation, textures, virtual objects, maps, game characters, parameters and other features of virtual objects and/or a virtual game world, etc. Such game data can be stored in memory by partitioning the game data into a number of blocks (e.g., uniformly-sized blocks), and a file system of a client machine is configured to control how these blocks of game data are stored and retrieved in and from local memory of the client machine. As a video game is played on a client machine, each request, made by the game executable(s) of the video game, to read a block(s) of game data is referred to herein as a "read operation."

Accordingly, a game executable of a video game can make a series of read operations to the file system throughout a game session.

The techniques, devices, and systems described herein pertain to using a file system proxy component of a client machine to track read operations made by a game executable of a video game during a game session, to generate access data based on the tracked read operations, and to report the access data to a remote system. An example process to be implemented by a client machine may include executing a game executable of a video game for playing the video game on the client machine, determining read operations made by the game executable to a file system of the client machine, generating access data based at least in part on the read operations, and sending, to a remote system, the access data, an identifier of the video game, and a configuration of the client machine. The read operations made by the game executable may request to read blocks of game data for the video game. Accordingly, the access data generated by the client machine may specify: (i) identifiers of the blocks of the game data that were accessed during the game session, and (ii) times, during execution of the game executable, at which the blocks of the game data were accessed based at least in part on the read operations.

This telemetry approach allows the remote system to collect access data reported by multiple client machines, to catalogue the access data according to client system configuration, and to analyze the access data to generate data that is usable by client machines to implement various game-related features including, without limitation, "instant play" of video games, discarding of unused blocks of game data to free up local memory resources, and/or local prefetching of game data for reducing latency during gameplay. An example process to be implemented by a remote system may include receiving, from multiple client machines having a client system configuration in common, access data associated a video game, analyzing the access data, generating data based at least in part on the analyzing of the access data, and sending the data to one or more client machines having the client system configuration. The access data received by the remote system may specify, for individual ones of the client machines: (i) identifiers of blocks of game data for the video game that were accessed by a game executable of the video game during execution of the game executable on an individual client machine, and (ii) times, during the execution of the game executable, at which the blocks of the game data were accessed by the game executable. Furthermore, the data generated by the remote system based at least in part on the analyzing of the access data may comprise at least one of: (i) download-sequence data specifying a sequence in which at least some of the blocks of the game data are to be downloaded to client machines having the client system configuration, or (ii) block-dependency data specifying individual associations between two or more blocks of the game data.

As mentioned, one example game-related feature that can be enabled is an "instant play" feature. The instant play feature described herein can allow a user who acquires a video game to start playing the video game upon acquiring the video game, and before game data is finished downloading to the user's client machine. Accordingly, a user does not have to wait for a video game to finish downloading before starting a game session of the video game. To enable the instant play feature, a remote system may receive, from multiple client machines, access data (as described herein) relating to a particular video game, and the remote system may generate, based on the access data, download-sequence data that specifies a sequence of blocks of game data for the video game. This sequence may position the blocks that are more likely to be accessed first towards the start of the sequence, and the blocks that are less likely to be accessed first towards the end of the sequence. In this manner, as the blocks of game data start downloading to the client machine, the blocks of game data that are most likely to be accessed early during the game session are stored in non-volatile memory of the client machine before downloading other blocks of game data that are less likely to be accessed early during the game session. This allows a user can start playing the video game upon acquiring the video game, even while blocks of game data are still being downloaded to non-volatile memory of the client machine. In fact, the techniques and systems described herein allow a user to start playing a video game even before a first block of game data is finished downloading to the client machine of the user. This is at least partly enabled by use of the file system proxy component on the client machine, which is configured to receive read operations made by the game executable, and to determine whether a requested block of game data has been downloaded to non-volatile memory or if the block still needs to finish downloading. If the block is "realized" in non-volatile memory, meaning that the block of game data has finished downloading to the non-volatile memory, the game executable can read the block of game data using the file system. If the block happens to have not finished downloading to non-volatile memory, the file system proxy component may intercept the read operation, request the unrealized block of game data from the remote system, and, once the block is received from the remote system, the block can be read using the file system. Although there may be a brief pause in the execution of the video game while an unrealized block of game data is retrieved from the remote system, the chances of this occurring frequently, or at all, are low assuming that the downloading of game data begins upon acquiring the video game, and assuming that the blocks of game data are downloaded in a sequence that aligns with the sequence in which the game executable accesses the blocks of data during the game session.

Another example game-related feature that can be enabled is freeing up local memory resources on a client machine by discarding unused blocks of game data. By freeing up local memory resources, the client machine can reclaim valuable storage capacity, which can be utilized for game data of other video games, and/or other data in general. To enable client-side discarding of game data, a client machine—with game data of a video game stored in non-volatile memory—may execute a game executable of the video game, and may generate access data over one or more game sessions as read operations are made by the game executable to a file system of the client machine. This access data may specify a first subset of blocks of the game data that were accessed over the course of one or more game sessions, as well as times at which those blocks were accessed during the game session(s). A remote system may receive the access data from the client machine, and the remote system may determine, based on the access data, one or more second blocks of the game data that can be classified as "unused" blocks based on the blocks having not been accessed by the game executable on the client machine for at least a threshold period of time or a threshold number of game sessions. In this case, the remote system may send an instruction to the client machine instructing the client machine to delete the one or more second blocks of the game data from non-volatile memory. When the client machine deletes these unused blocks from non-volatile memory, storage capacity on the client machine can be increased. Furthermore, if the game executable were to request to read a block of game data that has been deleted, the file system proxy component of the client machine can request the block of game data from the remote system in an on-demand fashion, with some added latency as compared to having the block stored on local memory.

Another example game-related feature that can be enabled is local prefetching of blocks of game data to decrease latency when loading the game data during a game session. To enable the local prefetching feature, a remote system may receive, from multiple client machines, access data (as described herein) relating to a particular video game, and the remote system may generate, based on the access data, block-dependency data that specifies individual associations between two or more blocks of the game data. For example, the block-dependency data may indicate that, whenever a first block of game data is accessed during a game session, a second block of game data is typically accessed within a threshold time period. In this manner, the block-dependency data may describe inter-block relationships between sets of two or more blocks based on access patterns that are exhibited in the access data received at the remote system. The remote system can send the block-dependency data to a client machine with the video game installed thereon, and when the client machine executes a game executable of the video game, the client machine can prefetch blocks of game data by caching the blocks in local memory that provides a faster read access speed than the memory on which the game data is persistently stored (e.g., non-volatile memory, such as a HDD, a SD card, etc.). This local prefetching can reduce the latency in load times when the game executable requests to read blocks of game data.

The techniques and systems described herein may improve the gameplay functionality of a client machine without having to change the way that game developers make video games today. For example, implementing a client-side component, such as the file system proxy component described herein, allows a user of the client machine to play a video game upon acquiring the video game, which means that the user does not have to wait (potentially hours) for the game to download before starting a game session. It also allows game data to be downloaded intelligently in a sequence of blocks that positions those blocks most likely to be accessed first at the start of the sequence, which helps to reduce latency during gameplay while the download of game data is in-progress. The gameplay functionality of a client machine may additionally, or alternatively, be improved by prefetching game data during game session in accordance with block-dependency data. This is because the client machine is able to predict which blocks of game data are likely to be accessed next in a series of read operations made by the game executable of the video game, and those blocks can be cached in local memory that provides faster read access speed (e.g., volatile memory, such as Random Access Memory (RAM)) than the non-volatile memory on which the game data is persisted. This "primes" the game data for quick access when the video game requests the game data.

The techniques and systems described herein may additionally, or alternatively, allow one or more devices to conserve resources at least with respect to memory resources. For example, using access data generated by one or more client machines to determine unused blocks of game data and deleting the unused blocks of game data can free up local memory resources on the client machine. For example, if a client machine, and/or the remote system, determines, from access data pertaining to tracked file system read operations, that a user never plays a game in single player mode, and always plays the game in multi-player mode, the single-player game data for the video game can be deleted from non-volatile memory of the client machine based on a determination that those blocks have not been used for at least a threshold period of time or a threshold number of game sessions.

FIG. 1 is a diagram illustrating an example environment 100 that includes a video game distribution platform configured to implement the techniques described herein. Users 102 (sometimes referred to as "customers") of a community may be associated with one or more client machines 104. Accordingly, the client machines 104(1)-(N) shown in FIG. 1 represent computing devices that can be utilized by a user community (or customer base) to execute programs thereon, such as video games. The client machines 104 can be implemented as any suitable type of computing device configured to process and render graphics on an associated display and to send/receive data over a network(s), including, without limitation, a PC, a desktop computer, a laptop computer, a mobile phone (e.g., a smart phone), a tablet computer, a portable digital assistant (PDA), a wearable computer (e.g., virtual reality (VR) headset, augmented reality (AR) headset, smart glasses, etc.), an in-vehicle (e.g., in-car) computer, a television (smart television), a set-top-box (STB), a game console, and/or any similar computing device.

The configurations of the client machines 104 may vary. For example, a subset of the client machines 104 may each use particular types, versions, or characteristics of hardware (e.g., central processing unit (CPU) model, graphics processing unit (GPU) model, etc.), and/or particular types, versions, or characteristics of firmware and/or software (e.g., a version of a graphics driver, downloadable content (DLC) package used for an install script, a language in which a video game client is running, etc.). These and other aspects of hardware, firmware, and/or software of the client machine 104 constitute a "configuration" of the client machine 104, as used herein, which is sometimes referred to as a "client system configuration," and they may dictate a finite set of depots that are used to download game data (partitioned into blocks of data) for a video game on the video game distribution platform. Accordingly, subsets of the client machines 104 may share a common client system configuration, and client system configurations may differ between these subsets of client machines 104. Client machines 104 that differ in terms of their client system configurations may download, store, and/or access blocks of game data differently, even for the same video game. Determining whether a pair of client machines 104 have a client system configuration in common may be based on the machines 104 sharing a threshold number of common types, versions, or characteristics of hardware, software, or firmware. For example, if two client machines 104 at least use the same DLC package for an install script, they may be considered to have the same client system configuration, notwithstanding some differences in other aspects (e.g., different GPU models, etc.).

With reference again to FIG. 1, the client machines 104 may communicate with a remote computing system 106 (sometimes shortened to "remote system 106") over a computer network 108. The computer network 108 may represent and/or include, without limitation, the Internet, other types of data and/or voice networks, a wired infrastructure (e.g., coaxial cable, fiber optic cable, etc.), a wireless infrastructure (e.g., radio frequencies (RF), cellular, satellite, etc.), and/or other connection technologies. The remote system 106 may, in some instances be part of a network-accessible computing platform that is maintained and accessible via the computer network 108. Network-accessible computing platforms such as this may be referred to using terms such as "on-demand computing", "software as a service (SaaS)", "platform computing", "network-accessible platform", "cloud services", "data centers", and so forth. In general, the remote system 106 is configured to collect access data 110 from the client machines 104, and is configured to catalogue (e.g., organize, categorize, classify, etc.) the access data 110 it receives within a data store 112. The remote system 106 may also be configured to analyze the access data 110 to generate data that is usable by the client machines 104 for implementing the various game-related features described herein. For example, the remote system 106 may be configured to generate download-sequence data 114 and/or block-dependency data 116, and the remote system 106 can distribute this data to client machines 104, as described herein. The remote system 106 may additionally, or alternatively, be configured to analyze the access data 110 to determine unused blocks of game data on one or more client machines 104, and may send, to the client machine(s) 104, instructions 118 to delete the unused blocks of game data in order to free up local memory resources on the client machine(s) 104.

In some embodiments, the remote system 106 acts as, or has access to, a distribution service to distribute (e.g., download) programs (and data) to the client machines 104. In an example, the client machines 104 may install a client application thereon. The client application, which may be a video game client (e.g., gaming software to play video games), may be configured to execute programs, such as video games, on the client machine 104 on which the client application is installed. With the client application installed, a client machine 104 may then have the ability to download programs (e.g., video games) from the remote system 106 over the computer network 108. Any type of content-distribution model can be utilized for this purpose, such as a direct purchase model where programs (e.g., video games) are individually purchasable for download and execution on a client machine 104, a subscription-based model, a content-distribution model where programs are rented or leased for a period of time, and so on. Accordingly, an individual client machine 104 may include one or more installed video games that are executable by loading the client application, and these video games may render graphics on a display during execution. In an example, a user 102 may choose to play one of multiple video games they have acquired (e.g., purchased, rented, leased, etc.) and downloaded from the remote system 106, such as by loading the video game client and selecting the desired video game to start execution of the video game.

Consider an example of FIG. 1 where some of the users 102 play a video game that is made available to those users 102 by the remote system 106. As the video game is played on respective client machines 104 of the users 102, game executables running on each client machine 104 may continually request a file system to read blocks of game data for the video game. The read operations made by a game executable may be tracked by a file system proxy component of the client machine 104 to generate access data 110. For example, a game executable running on a client machine 104(1) can issue requests to the file system of the client machine 104(1) during game execution to read blocks of game data from one or more local memory resources of the client machine 104(1), such as by reading blocks of game data from sectors of a hard disk drive (HDD) or from sectors of a Secure Digital (SD) card that is removably coupled to the client machine 104(1). Accordingly, a game executable for the video game executing on a client machine 104(1) can make a series of read operations to the file system throughout a game session, and the file system proxy component of the client machine 104(1) may track the read operations to generate access data 110.

The access data 110 may specify: (i) block identifiers that identify accessed blocks of the game data for a video game (e.g., the blocks that were accessed by the game executable during a game session), as well as (ii) times, during execution of the game executable, at which the accessed blocks of the game data were accessed by virtue of the game executable making the read operations. As mentioned, game data for a video game may comprise textures, virtual objects, maps, game characters, and the like. In some embodiments, the game data may be stored across sectors of non-volatile memory (e.g., sectors of a HDD, SD card, etc.) and organized in blocks of game data within the sectors. Using blocks is a flexible way of handling files of varying sizes while avoiding the need to store every file using contiguous storage space in the file system. Each block of game data may be referenced and/or located using a block identifier (e.g., a number). In general, one or more processors of the client machine 104 may perform read, write, and/or other storage operations as directed by one or more device drivers. In some embodiments, the client machine 104 may create a mapping between blocks of game data and sectors of non-volatile memory in order to determine which blocks were accessed and where (e.g., what sectors) they were accessed from, based on the read operations made by the game executable during gameplay. For example, if the game executable makes a read operation to access game data stored in a first sector of non-volatile memory, an identifier(s) of the particular block(s) of game data that is/are stored in the first sector may be specified in the access data 110. Moreover, the access times specified in the access data 110 may allow for determining an order (or sequence) in which blocks were accessed during a game session (e.g., block A was accessed first, followed by block D, followed by block F, and so on and so forth), as well as relative times of access (e.g., 4 minutes into the game session, 9 minutes into the game session, 1 hour into the game session, etc.).

The access data 110 received by the remote system 106 may be catalogued in the data store 112 according to a unique client system configuration, and/or according to the video game ID of the corresponding video game. The access data 110 may additionally be stored in association with a user account of a user who is logged into a video game client executing on the client machine 104 that sent the access data 110. FIG. 1 shows a data store 112 maintained by the remote system 106 for storing, cataloguing, or otherwise organizing, the access data 110 it receives from the client machines 104. The data store 112 may organize the access data 110 into groups (or buckets) that are each associated with a unique combination of client system configuration and video game ID. In other words, each bucket of access data 110 in the data store 112 may be tied to a particular program (e.g., video game) and to a particular client system configuration, as described herein.

FIG. 1 shows a client machine 104(N) sending a request 120 to acquire (e.g., purchase, rent, lease, etc.) a video game from the remote system 106. For example, a user of the client machine 104(N) who is logged into his/her user account via an installed video game client, may conduct a transaction via the remote system 106 to purchase the video game. In response to the request 120, the client machine 104(N) may receive, from the remote system 106, a game executable 122 of the video game, and the client machine 104 may also receive download-sequence data 114 and/or block-dependency data 116 for the acquired video game and for the specific client system configuration of the client machine 104. Accordingly, it is to be appreciated that the request 120 may include the configuration of the client machine 104(N), which tells the remote system 106 to look for download-sequence data 114 and block-dependency data 116 that may be available for that particular client system configuration.

FIG. 1 also depicts the remote system 106 starting to download blocks 124 of game data 126 for the acquired video game in accordance with a sequence of blocks specified in the download-sequence data 114. FIG. 1 shows an example where a first block 124(1) is downloaded, followed by a second block 124(2), which is followed by a third block 124(3), and so on and so forth. Although three blocks 124 are depicted in FIG. 1 as being downloaded to the client machine 104(N), it is to be appreciated that the download sequence may include any number of blocks 124, including additional blocks that are downloaded after block 124(3). The client machine 104(N) may download the blocks 124 to non-volatile memory of the client machine 104(N), such as to a HDD, a SD card, or the like.

As shown in FIG. 1, the client machine 104(N) may implement an instant play 128 feature where the client machine 104(N) may start executing the game executable 122 for the acquired video game before or during the download of the blocks 124 of game data 126. For example, the client machine 104(N) may start executing the game executable 122 before the first block 124(1) of game data is even downloaded. The game executable 122 may start in response to user input received by the client machine 104(N), such as a user 102 providing a user using a mouse and/or keyboard, a game controller, etc., to launch the newly acquired video game. In this sense, there may be no restrictions placed upon the user 102 as to when the user 102 can start playing the video game. As a consequence, the user 102 may start playing the game, and the game executable 122 may start executing before the first block 124(1) of game data is downloaded to the client machine 104(N). If the user 102 chooses to wait a period of time after acquiring the video game, the game executable 122 may start executing after at least one block 124(1) of game data 126 has been downloaded to the client machine 104(N).

In some embodiments, a video game client running on the client machine 104(N) may be configured to prevent the game executable 122 from starting until a predetermined time has lapsed since starting the download of blocks 124, or until a predetermined event occurs (e.g., by waiting until a threshold number of blocks 124 have been downloaded before allowing the user 102 to start playing the game). The predetermined time or event may be determined by the remote system 106 based on how well-suited the video game is for the instant play 128 feature, and the remote system 106 may send instructions to the video game client upon acquisition of the video game to wait for the predetermined period of time to lapse and/or to wait for the occurrence of the predetermined event before allowing the game executable 122 to run on the client machine 104(N). In some embodiments, the remote system 106 may send data to the client machine 104(N) for outputting a recommendation to the user 102 via the client machine 104(N), such as by displaying a recommendation that states "For the best user experience, we recommend waiting 5 minutes after starting the download to play [Video Game X]". In one example, if the video game is well-suited for the instant play 128 feature, the remote system 106 may instruct the client machine 104(N) to output a notification that states "This game is ready for instant play, so you can start playing right now. Enjoy!".

As shown in FIG. 1, another client machine 104(2) may implement a local prefetching 130 feature where the client machine 104(2) may prefetch one or more realized block 124 of game data 126 to reduce latency during gameplay. For example, game data 126 for a video game may be stored in first memory 132(1) that provides read access at a first speed. This first memory 132(1) may represent non-volatile memory, such as a HDD, SD card, etc., where the game data 126 is persisted. The client machine 104(2) may also include second memory 132(2) that provides read access at a second speed faster than the first speed. This second memory 132(2) might be additional non-volatile memory (e.g., a SSD), or it may be volatile memory (e.g., working memory, such as RAM). In any case, the block-dependency data 116 can be used by the client machine 104(2) to determine whether a block(s) 124 is likely to be read next by the game executable 122, and if so, the block(s) 124 can be cached in the second memory 132(2) so that, when the game executable 122 eventually requests to read the block(s) 124, the block(s) 124 can be quickly accessed from the second memory 132(2), rather than accessing the block(s) 124 from the relatively slower first memory 132(1). As will be described in more detail below, multiple different local memory resources 132 can be utilized to cache blocks 124 of game data 126 as part of the local prefetching 130 feature, which can improve the overall bandwidth and reduce latency even more than caching blocks 124 exclusively in, say, working memory. This is based on the notion that the game executable 122 can read from the different local storage resources 132, including the first memory 132(1), in parallel to improve the overall bandwidth and reduce latency by an even greater amount.

As shown in FIG. 1, yet another client machine 104(1) may implement a delete unused game data 134 feature where the client machine 104(1) receives an instruction 118 from the remote system 106 to delete one or more blocks 124 of game data 126 stored in non-volatile memory of the client machine 104(1), and, in response, the client machine 104(1) can delete the one or more blocks 124 to free up local memory on the client machine 104(1). For example, the remote system 106 may determine, from the access data 110 received from the client machine 104(1), that the user 102 of the client machine 104(1) has never played a single-player mode of a video game, and, as a consequence, the blocks 124 of game data 126 for the video game that are usable to play the video game in the single-player mode have not been accessed by the game executable 122 for a threshold period of time or a threshold number of game sessions. Accordingly, the remote system 106 may send instructions 118 to one or more client machines 104, such as the client machine 104(1), instructing the client machine(s) 104 to delete, from non-volatile memory thereon, one or more unused blocks 124 of the game data 126 that were previously downloaded to the client machine(s) 104 and determined to be classifiable as "unused" blocks 124. The instructions 118 may specify identifiers of the unused blocks 124 so that the client machine 104(1) can delete the correct blocks 124 of game data 126, thereby freeing up local memory capacity without compromising the user experience of playing the game on the client machine 104(1).

Figure 2:
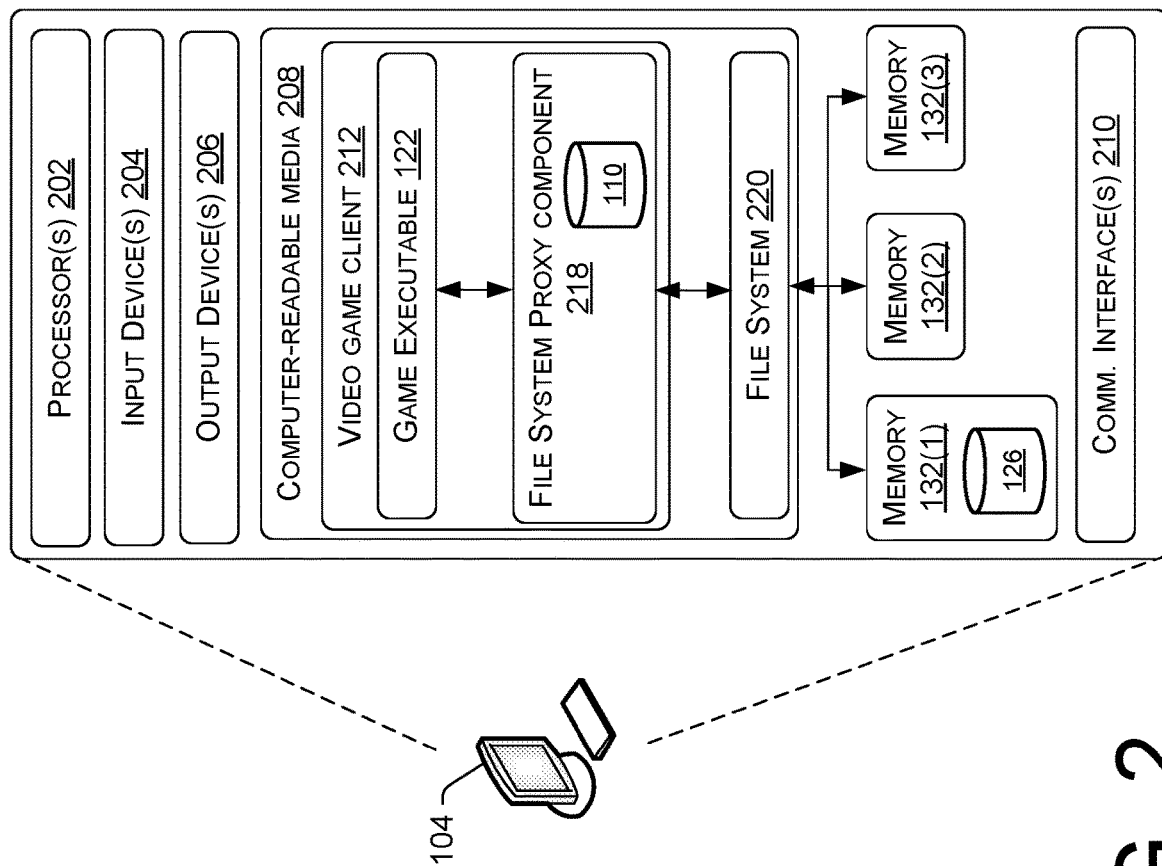
FIG. 2 shows a block diagram illustrating example components of a client machine and a flow diagram of an example process for tracking file system read operations to generate access data, and for sending the access data to a remote system.
Figure 2:
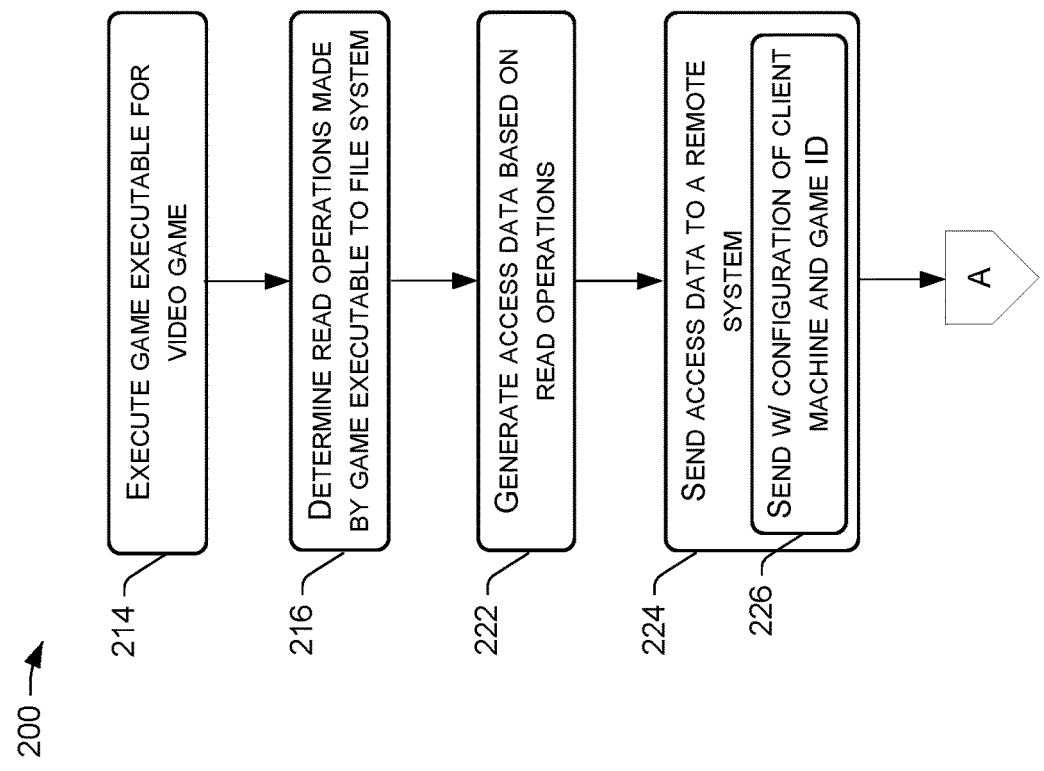

FIG. 2 shows a block diagram illustrating example components of a client machine 104 and a flow diagram of an example process 200 for tracking file system read operations to generate access data 110, and for sending the access data 110 to a remote system 106. In the illustrated implementation, the client machine 104 includes, among other components, one or more processors 202, such as a central processing unit(s) (CPU), a graphics processing unit(s) (GPU), etc., one or more input devices 204, one or more output devices 206, non-transitory computer-readable media 208, local memory 132, and a communications interface(s) 210.

The non-transitory computer-readable media 208 may include volatile and nonvolatile memory, removable and non-removable media implemented in any method or technology for storage of information, such as computer-readable instructions, data structures, program modules, or other logic and/or data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 208 may be implemented as computer-readable storage media ("CRSM"), which may be any available physical media accessible by the processor(s) 202 to execute instructions stored on the computer-readable media 208. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 202. Furthermore, although the local memory 132 is shown as being separate from the computer-readable media 208, it is to be appreciated that the computer-readable media 208 and any one or more of the local memories 132(1), 132(2), and/or 132(3) may represent the same memory, or at least portions of the same memory, in some implementations.

Reference is now made to the process 200 shown in FIG. 2. The processes described herein are illustrated as a collection of blocks in a logical flow graph, which represent a sequence of operations that can be implemented in hardware, software, firmware, or a combination thereof (sometimes referred to as "logic" herein). In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

For discussion purposes, it is assumed that the client machine 104 performing the process 200 has previously installed a video game client 212, which represents a client application that is stored in the computer-readable media 208 and is configured to execute a game executable 122 for a video game. A user 102 of the client machine 104 may acquire (e.g., purchase, rent, lease, etc.) video games, which, upon acquisition, may be installed (e.g., downloaded from the remote system 106) and maintained non-volatile memory. In some embodiments, the first local memory 132(1) (sometimes referred to as "first memory 132(1)") may represent non-volatile memory (e.g., a HDD, SD card, etc.), and the first memory 132(1) may provide read access at a first speed. When blocks 124 of game data 126 are downloaded from the remote system 106, the blocks 124 of game data 126 may be downloaded to the first memory 132(1). Meanwhile, the second memory 132(2) may represent additional non-volatile memory (e.g., a solid-state drive (SSD)), and the second memory 132(2) may provide read access at a second speed faster than the first speed provided by the first memory 132(1). Additionally, the third memory 132(3) may represent volatile memory (e.g., working memory, such as RAM), and the third memory 1320(3) may provide read access at a third speed faster than the second speed. It is to be appreciated that the client machine 104 may implement fewer local memory 132 resources than those shown in FIG. 2 (e.g., by omitting the second memory 132(2)), or additional local memory 132 resources.

At 214, the video game client 212 may execute a game executable 122 of a video game on the client machine 104. For example, a user 102 of the client machine 104 may load the video game client 212, and the loaded video game client 212 may provide the user 102 with the ability to execute a previously downloaded video game (via execution of the game executable 122), and/or acquire a new video game from the remote system 106. The game executable 122 may be loaded into working memory, such as the third memory 132(3) where it executes to, among other things, render graphics on the display of the client machine 104. There may be a startup phase and a playtime phase during a game session. During a game session, the game executable 122 may be configured to receive input data from the input device(s) 204 (e.g., a mouse and/or keyboard, game controller(s), head-mounted display (HMD), microphone(s), etc.), and may determine blocks 124 of game data 126 to access for rendering a next frame of video game content on a display(s) (i.e., an output device(s) 206) of the client machine 104. For example, the game executable 122 may be configured to determine which portions of the game world to render in an upcoming frame, as well as which objects and/or textures to render in the upcoming frame, and may issue read operations to read the corresponding blocks 124 of game data 126 for presenting the upcoming frame.

At 216, a file system proxy component 218 executing on the client machine 104 may determine (e.g., receive, monitor, intercept, etc.) read operations (e.g., a first read operation, a second read operation, etc.) made by the game executable 122 to a file system 220 of the client machine 104. The file system 220 may be configured to control how data, including blocks 124 of game data 126 for the video game, is stored and retrieved. Whether all of the game data 126 for the video game is realized in a local memory resource, such as the first memory 132(1) or not, the file system proxy component 218 may be configured to "lie" to the video game about what blocks 124 (e.g., files) of game data 126 exist on non-volatile memory of the client machine 104 (e.g., on the HDD, SD card, etc.). For example, the video game client 212, via the file system proxy component 218, may know, based on the identifier of the video game, the list of game files that are supposed to be stored in non-volatile memory, the size of the game files, and possibly the sectors of non-volatile memory where the game files are to be stored. This makes the video game (e.g., the game executable 122) think that all blocks 124 of the game data 126 for the video game are stored in the first memory 132(1), for example. The file system proxy component 218 may be an extension of the file system 220 in order to fabricate this information, if necessary, and surface it to the game executable 122. In any case, consider an example where all blocks 124 of the game data 126 for the video game are stored in, and accessible from, the first memory 132(1) of the client machine 104. In this example, the file system proxy component 218 may act as a pass-through that merely monitors the read operations made by the game executable 122 to the file system 220. As described in more detail herein, particular blocks 124 of game data 126 may be prefetched from the first memory 132(1) and cached in at least one of the second memory 132(2) or the third memory 132(3), both of which provide faster read access speed than the read access speed provided by the first memory 132(1). The file system 220 can keep track of where blocks 124 of game data 126 are stored at any given moment and may access the blocks 124 of game data 126 from the appropriate memory resources 132 to serve the read operations made by the game executable 122 during a game session.

At 222, the file system proxy component 218 may generate access data 110 based at least in part on the read operations it receives from the game executable 122. As described elsewhere herein, this access data 110 may specify: (i) identifiers of the blocks 124 of the game data 126 that were accessed by the game executable 122 during the game session, and (ii) times, during the execution of the game executable 122, at which the accessed blocks 124 of the game data 126 were accessed by the game executable 122. For example, with respect to two blocks 124 of game data 126, the access data 110 may specify: (i) a first identifier of the first block of the game data, (ii) a first time, during execution of the game executable, at which the first block of the game data was accessed based at least in part on the first read operation, (iii) a second identifier of the second block of the game data, and (iv) a second time, during the execution of the game executable, at which the second block of the game data was accessed based at least in part on the second read operation. In some embodiments, the access time for each accessed block 124 may be expressed in the access data 110 as a time that is measured from a start of the game session (e.g., Block A was accessed 4 minutes after starting the game session, Block D was accessed 13 minutes after starting the game session, etc.).

At 224, the client machine 104 may send the access data 110 to a remote system 106, such as via the communications interface(s) 210 and over a computer network 108. The communication interface(s) 210 may implement multiple types of wired and/or wireless or radio technologies. For example, the communication interface(s) 210 may implement a radio such as a Bluetooth Low Energy (BLE) radio, a Wi-Fi radio, and/or a cellular radio, and so on. It is to be appreciated that the communication interface(s) 210 may further include physical ports to facilitate a wired connection to a network, a connected peripheral device, or a plug-in network device that communicates with other wireless networks.

As shown in the sub-block 226, the access data 110 may be sent at 224 along with a configuration of the client machine 104 and an identifier of the video game. Furthermore, the access data 110 may be sent at any suitable time(s) to the remote system 106, such as in real-time, or substantially real-time, by streaming the access data 110 to the remote system 106 as the access data 110 is generated, and/or in response to events (e.g., periodically, during idle times where processing resource consumption is relatively low, such as below a threshold percentage of resource consumption, when network connectivity resumes (e.g., after playing the game offline), after the client machine 104 stops execution of the game executable 122 (e.g., after the user 102 ends the game session by exiting the video game), etc.). The access data 110 can also be sent in any suitable format for transmitting metadata resulting from the tracked read operations on the client machines 104, such as by sending the access data 110 to the remote system 106 as artifacts. The process 200 represents a "telemetry" approach for collecting access data 110 at the remote system 106. Considering that a large number of client machines 104 may be performing the process 200, the remote system 106 may collect the access data 110 that is sent (e.g., uploaded, reported, etc.) at block 224 from a vast number of client machines 104 having different client system configurations.

Figure 3:
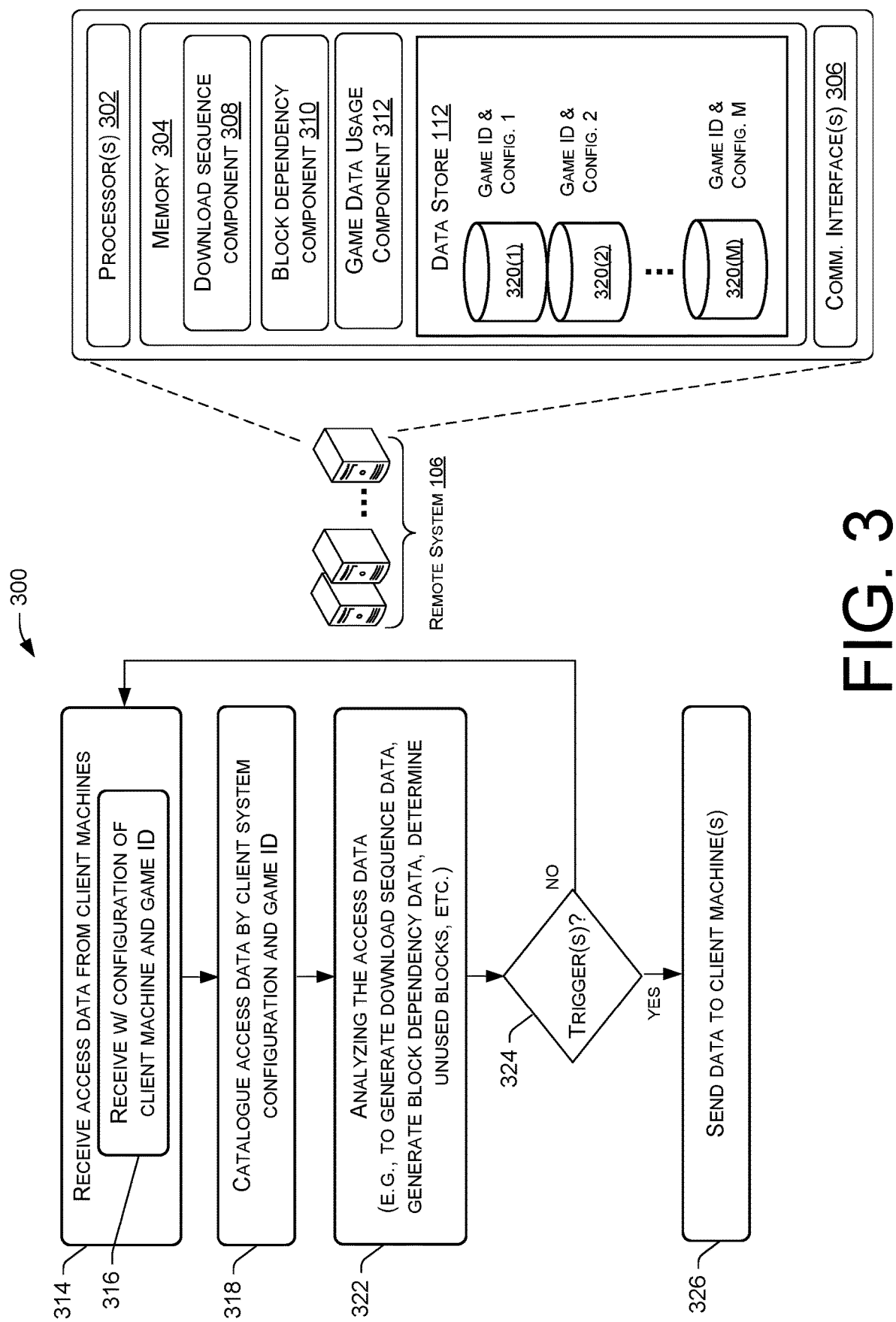
FIG. 3 shows a block diagram illustrating example components of a remote system and a flow diagram of an example process for receiving access data from client machines, and for analyzing the access data across one or more users for implementing the techniques described herein.

FIG. 3 shows a block diagram illustrating example components of a remote system 106 and a flow diagram of an example process 300 for receiving access data 110 from client machines 104, and for analyzing the access data 110 across one or more users 102 for implementing the techniques described herein. In the illustrated implementation, the remote system 106 includes, among other components, one or more processors 302, memory 304 (or non-transitory computer-readable media 304), and a communications interface(s) 306. The memory 304 (or non-transitory computer-readable media 304) may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 304 may be implemented as computer-readable storage media ("CRSM"), which may be any available physical media accessible by the processor(s) 302 to execute instructions stored on the memory 304. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 302. A download sequence component 308, a block-dependency component 310, and/or a game data usage component 312 may represent instructions stored in the memory 304 that, when executed by the processor(s) 302, cause the remote system 106 to perform the techniques and operations described herein. For example, the download sequence component 308 may be configured to generate download-sequence data 114 based on access data 110, as described herein. The block-dependency component 310 may be configured to generate block-dependency data 116 based on the access data 110, as described herein. The game data usage component 312 may be configured to determine unused blocks 124 of game data 126 on a per-user or per-client machine 104 basis, as described herein.

The communication interface(s) 306 may implement multiple types of wired and/or wireless or radio technologies. For example, the communication interface(s) 306 may implement a radio such as a Bluetooth Low Energy (BLE) radio, a Wi-Fi radio, and/or a cellular radio, and so on. It is to be appreciated that the communication interface(s) 306 may further include physical ports to facilitate a wired connection to a network, a connected peripheral device, or a plug-in network device that communicates with other wireless networks.

Reference is now made to the process 300 shown in FIG. 3. At 314, the remote system 106 may receive access data 110 from client machines 114 (e.g., as part of a "telemetry" approach using the process 200, described above). The received access data 110 may specify, for a particular client machine 104, identifiers of the blocks 124 of game data 126 for a video game that were accessed on the particular client machine 104 by the game executable 112 of the video game, and the times at which the blocks 124 were accessed during a game session (e.g., during execution of a game executable(s) 122 of the video game). As shown by sub-block 316, the access data 110 may be received along with a configuration of the particular client machine 104, and along with an identifier of the video game that was executed during generation of the access data 110.

At 318, the remote system 106 may catalogue the access data 110 it receives at block 314 by (or according to) client system configuration and game identifier. For example, the data store 112 may include multiple groups or buckets 320(1)-(M) that are classified by a unique combination of game ID and client system configuration. Taking, for example, a first client machine 104(1) with client system configuration "1", when first access data 110 is received at block 314 from the first client machine 104(1), the first access data 110 may be catalogued at block 318 into a first bucket 320(1) (or group), and this bucket 320(1) may be tagged with the game ID of a video game and the client system configuration of the first client machine 104(1) received from the first client machine 104(1) at sub-block 316. Likewise, a second client machine 104(2) may send second access data 110, and this second access data 110 may be catalogued at block 318 into a second bucket 320(2), which may be tagged with a game ID of a video game and a second client system configuration "2" of the second client machine 104(2) received from the second client machine 104(2) at sub-block 316. This can continue for any number of "M" buckets, depending on the number of client machines 104 reporting access data 110, depending on whether those client machines 104 have different client system configurations, and/or depending on how many different video games are being executed on those client machines 104.

At 322, the remote system 106 may perform analytics on the access data 110 received at block 314 to generate data (e.g., results of the analysis). This generated data may include, without limitation, download-sequence data 114 for one or more video games, block-dependency data 116 for one or more video games, and/or determinations of unused blocks 124 of game data 126 on a per-user/per-client machine basis.

At 324, the remote system 106 may determine whether a trigger event(s) has occurred. Trigger events may vary, but may include, without limitation, receiving a request 120 from a client machine 104 to acquire (e.g., purchase, rent, lease, etc.) a video game, generating new download-sequence data 114 and/or new block-dependency data 116 for a video game, determining that there are unused blocks 124 of game data 126 on a client machine 104 that have not been access for a threshold period of time or a threshold number of game sessions, passage of a period of time, etc.

If the remote system 106 determines, at block 324, that a trigger event has not occurred, the process 300 may follow the "NO" route from block 324 back to block 314 where the remote system 106 continues to collect/receive access data 110 from client machines 104. If the remote system 106 determines, at block 324, that a trigger event(s) has occurred, the process 300 may follow the "YES" route from block 324 to block 326 where the remote system 106 may send data to one or more client machines 104. For example, if the trigger event comprises a client machine 104 acquiring a video game, the remote system 106 may retrieve download-sequence data 114 for the video game, and may send the download-sequence data 114 to the client machine 104, along with a game executable 122 for the video game. Additionally, or alternatively, the remote system 106 may retrieve block-dependency data 116 for a video game, and may send the block-dependency data 116 to a client machine(s) 104. As yet another example, if the trigger event comprises determining that there is/are an unused block(s) 124 of game data 126 on a client machine 104, the remote system 106 may send instructions to delete the unused block(s) of game data.

It is to be appreciated that at least some of the components of the client machine 104 shown in FIG. 2 may be implemented as a component(s) of the remote system 106, in some embodiments. For example, the game executable 122 may execute on the remote system 106 (e.g., as part of a video game streaming service), and the game executable 122 may receive data over the network 108 from the client machine 104 indicative of user input while playing the video game. In this scenario, the game data 126 for the video game may be stored at the remote system 106 as well, and the file system proxy component 218 may be a component of the remote system 106 that receives read operations from the game executable 122 to monitor the blocks 124 of game data 126 accessed during gameplay. In this configuration, the client machine 104 may act as a thin-client, with most of the processing performed in the cloud during a video game session. In another example, the download sequence component 308, the block dependency component 310, and/or the game data usage component 312 may be components of the client machine 104. In this example, the client machine 104 may receive access data 110 generated by other client machines 104 that has been collected by the remote system 106, and the client machine 104 may perform analytics on its own access data 110 and/or access data 110 generated by other client machines 104 to determine download-sequence data 114, block-dependency data 116, and/or unused blocks 124 of game data 126 stored on the client machine 104.

Figure 4:
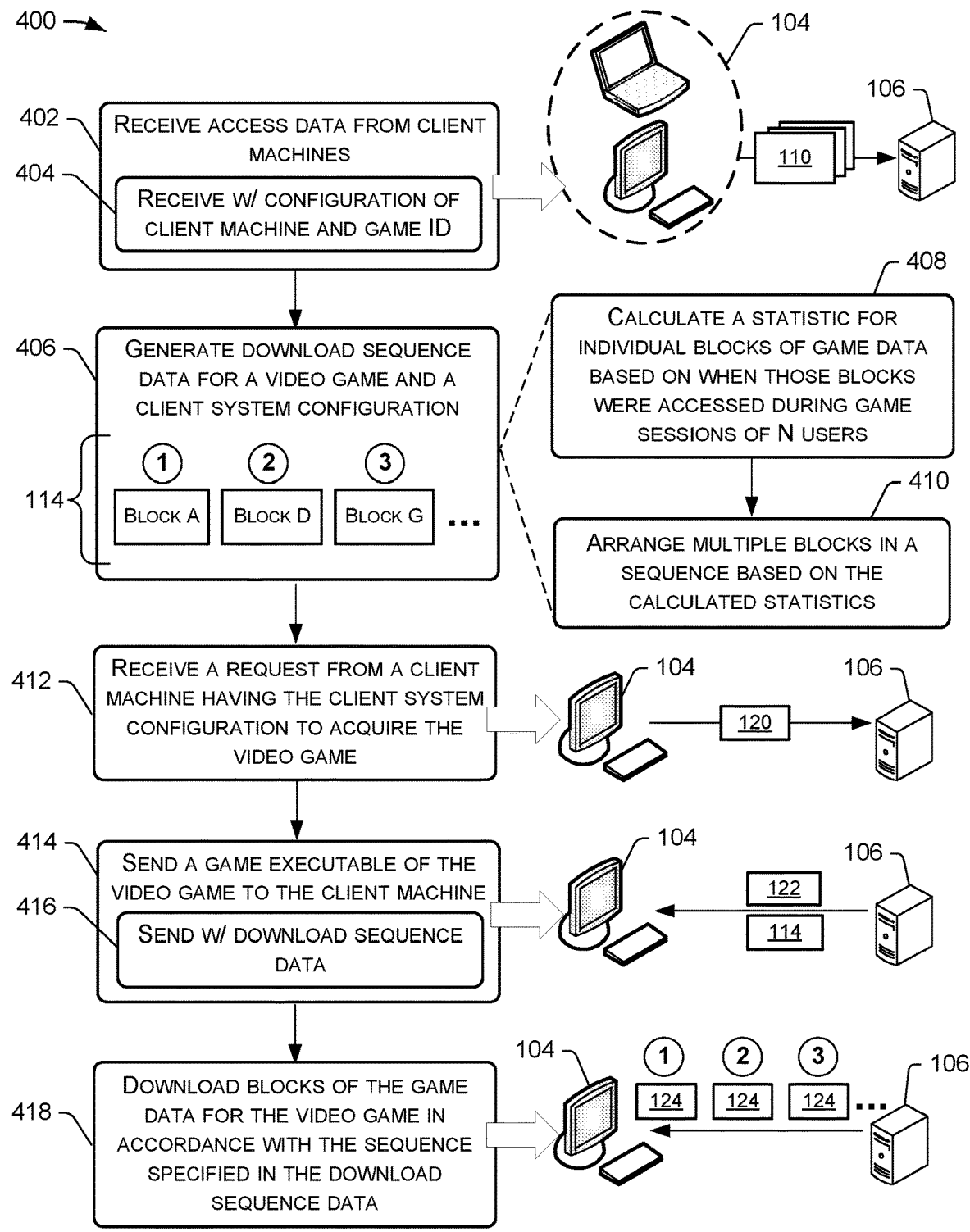
FIG. 4 is a flow diagram of an example process for generating, based on access data received from multiple client machines, download-sequence data for use by client machines to download blocks of game data in a particular sequence of blocks.

FIG. 4 is a flow diagram of an example process 400 for generating, based on access data 110 received from multiple client machines 104, download-sequence data 114 for use by client machines 104 to download blocks 124 of game data 126 in a particular sequence of blocks 124.

At 402, the remote system 106 may receive, from multiple client machines 104, access data 110 associated a video game. The access data 110 received at block 402 may specify, for individual ones of the client machines 104, (i) accessed blocks 124 of game data 126 associated with the video game that were accessed by a game executable 122 of the video game during execution of the game executable 122 on an individual client machine, and (ii) times, during the execution of the game executable 122, at which the accessed blocks 124 of the game data 126 were accessed by the game executable 122. As shown by sub-block 404, the access data 110 may be received along with a configuration of the client machine 104 that sent the access data 110, and/or a game identifier of a video game that executed on the client machine 104 when the access data 110 was generated.

At 406, the remote system 106 may generate, based at least in part on the access data 110, download-sequence data 114 associated with a client system configuration and a game identifier of a video game. The download-sequence data 114 may specify a sequence of blocks 124 of game data 126 for the video game, and this sequence may represent the order in which blocks 124 of the game data are to be downloaded to a client machine 104 having a particular client system configuration. The download sequence for a video game can be determined in any suitable manner. As shown by sub-blocks 408 and 410, the generation of the download-sequence data 114 may include multiple sub-operations.

At 408, statistics may be calculated for at least some blocks 124 of game data 126 for a video game based at least in part on when (e.g., a time, a position/order/rank, etc.) those blocks 124 were accessed (as specified in the access data 110) over N game sessions of N corresponding users 102 who played the video game ("N" being any positive integer). For example, based on the access data 110 associated with N users 102 who played the video game, the remote system 106 may determine a statistic (e.g., an average value) based on the times at which those blocks 124 were accessed by each of the N users 102 during a game session (e.g., during an initial game session). The remote system 106 may determine, for instance, the average access time for block A was 30 minutes into an initial game session (e.g., based on multiple different times at which block A was accessed by the N different users), the average access time for block B was 45 minutes into the initial game session, the average access time for block C was 2 hours into the initial game session, and so on and so forth. The remote system 106 may additionally, or alternatively, determine that block A was the first block accessed by user A during the initial game session, block A was the fifth block accessed by user B during the initial game session, block A was the seventh block accessed by user C during the initial game session, and so on and so forth for N users, and then the remote system 106 may determine a statistic (e.g., an average position/order/rank) for block A based at least in part on this information about when the block was accessed by the N different users 102. This can be repeated for other blocks 124 that were accessed during the game session. These analytics can be performed at least for an initial game session. The analytics can be performed for any subsequent game sessions, as well, to determine which blocks 124 of game data 126 are typically accessed during a game session(s).

At 410, based on the calculated statistics, a download sequence can be determined for multiple blocks 124 of game data 126 for the video game. The blocks 124 specified in the download sequence may be some of the blocks 124 of game data (e.g., a fraction of the total number of blocks 124), or the download sequence may include all of the blocks 124 of game data 126. It is to be appreciated that, for a given video game, the ratio between the initial number of blocks 124 that are likely to be accessed during an initial period of playtime, and the duration of the initial period of playtime can be somewhat lopsided. In other words, 2 Gigabytes of game data 126 may provide an initial 6 hours of playtime for a particular video game, and the remainder of the game data 126 may be unlikely to be accessed during this initial play period. This means that certain games may be well suited for the "instant play" 128 feature, and they could be flagged as "good Instant Play games" that are well suited for Instant Play based on this ratio. In other words, certain games can be flagged if a relatively long initial play period can be supported by a relatively small amount of game data 126. Single player games, by way of example, may be well-suited for the "instant play" 128 feature with little-to-no latency because new players may be required to play the same level first. This means that, for a single player game, the remote system 106 might determine that all, or almost all, players who play the game for the first time access the same blocks 124 within the first X hours of playtime, and this pattern may be substantially linear and consistent across a set of N players—e.g., all N players may access Block A, then Block H, the Block Q, and so on and so forth. While there may be a discrepancy in the exact times at which the blocks 124 are accessed, there might be a common order of blocks 124 accessed over an initial period of playtime for a given video game. By contrast, a multiplayer game may have an open game world with a giant map. For example, across N users, the N users may drop into the game initially at different locations in the open world, and each game executable 122 will have accessed different blocks 124 of game data 126 that correspond to the different locations in the open world where the matched players dropped into the game. This is an example of a game that is ill-suited for the instant play 128 feature.

Assuming a video game can support the instant play 128 feature, a download sequence may specify an ordering of Block A, Block D, Block G, Block C, Block F, Block E, etc. Accordingly, for any video game, and for any client system configuration, the remote system 106 can determine, at least for a period of playtime (e.g., the first 6 hours of playtime), the average user 102 is likely to exclusively access a particular subset of blocks 124 of the game data, and is likely to access those blocks 124 in a particular sequence during that period of playtime. It is to be appreciated that, in some embodiments, the download sequence may be user-specific. That is, for the same video game and the same client system configuration, a first download sequence may be determined for a first user 102 and a second download sequence may be determined for a second user 102, the second download sequence different than the first download sequence. This may be based on the unique access patterns exhibited in user-specific access data 110.

At 412, the remote system 106 may receive, from a client machine 104, a request 120 to acquire the video game, the request 120 including a configuration of the client machine 104. For example, a user 102 of the client machine 104 who is logged into his/her user account via the video game client 212, may conduct a transaction via the remote system 106 to purchase the video game.

At 414, the remote system 106 may send a game executable 122 of the video game to the client machine 104. This game executable 122 may be executable code (e.g., a file(s)) executable by the processor(s) 202 of the client machine 104 to start playing the video game on the client machine 104. As shown by sub-block 416, the remote system 106 may send the download-sequence data 114 to the client machine 104 for the client machine 104 to start downloading blocks 124 of game data 126 for the acquired video game in the sequence specified by the download-sequence data 114.

At 418, the remote system 106 may download blocks 124 of the game data to the client machine 104 in accordance with the sequence specified in the download-sequence data 114. This may take some time depending on the downlink data transfer rate achievable for the client machine 104. Accordingly, because the sequence of blocks 124 being downloaded, the blocks 124 that are most likely to be accessed first are realized in local memory 132 of the client machine 104 before other blocks, and by the time the game executable 122 of the video game requests to read the other blocks, those blocks are likely to have finished downloading to the client machine 104.

Figure 5:
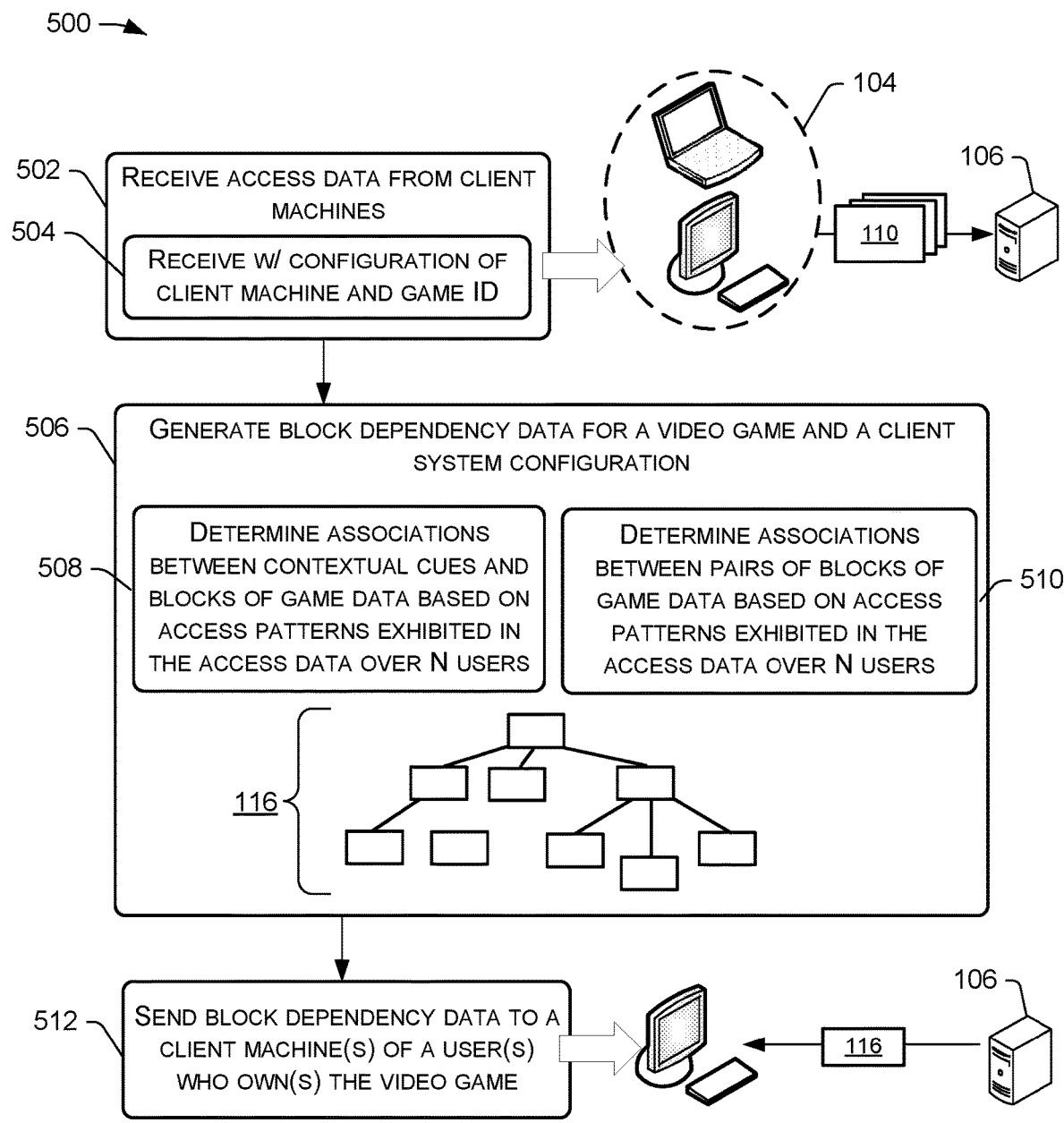
FIG. 5 is a flow diagram of an example process for generating, based on access data received from multiple client machines, block-dependency data for use by client machines to prefetch blocks of game data to reduce latency during gameplay.

FIG. 5 is a flow diagram of an example process 500 for generating, based on access data 110 received from multiple client machines 104, block-dependency data 116 for use by client machines 104 to prefetch blocks 124 of game data 126 to reduce latency during gameplay.

At 502, the remote system 106 may receive, from multiple client machines 104, access data 110 associated a video game. The access data 110 received at block 502 may specify, for individual ones of the client machines 104: (i) accessed blocks 124 of game data 126 associated with the video game that were accessed by a game executable 122 of the video game during execution of the game executable 122 on an individual client machine, and (ii) times, during the execution of the game executable 122, at which the accessed blocks 124 of the game data 126 were accessed by the game executable 122. As shown by sub-block 504, the access data 110 may be received along with a configuration of the client machine 104 that sent the access data 110, and/or a game identifier of a video game that executed on the client machine 104 when the access data 110 was generated.

At 506, the remote system 106 may generate, based at least in part on the access data 110, block-dependency data 116 associated with a client system configuration and a game identifier of a video game. The block-dependency data 116 may specify individual associations between two or more blocks 124 of the game data 126 for the video game. Said another way, the remote system 106 can predict one or more blocks 124 of game data 126 that will be accessed if a particular event occurs. In this manner, a map of dependencies (e.g., branching, tree-like dependencies) between blocks 124 of game data 126 and/or between blocks 124 and contextual cues can be built based on the access data 110. As shown by sub-blocks 508 and 510, the generation of the block-dependency data 116 may include one or more sub-operations.

At 508, the remote system 106 may determine, based on access patterns (e.g., access times) exhibited in the access data 110 received from N users 102 that played a video game, associations between contextual cues and blocks 124 of game data 126 for the video game. For example, the remote system 106 may determine that whenever a particular contextual cue is detected (e.g., whenever the user 102 navigates to a library page of the video game), a particular block 124 of game data 126 is typically (e.g., averaged across the N users) accessed within a threshold time period. This type of correlation can be determined based at least in part on the access times specified in the access data. For example, if, across N users, Block A is the most accessed block within the first 15 seconds of the N users navigating to the library page of the video game, Block A may be associated with this type of contextual cue.

At 510, the remote system 106 may determine, based on access patterns (e.g., access times) exhibited in the access data 110 received from N users 102 that played a video game, associations between pairs of blocks 124 of game data 126 for the video game. For example, the remote system 106 may determine, based on the access data 110 received from N users 102 that played a video game, whenever a first block 124(1) of game data 126 is accessed during a game session, a second block 124(2) of game data 126 is typically accessed within a threshold time period. In this manner, the remote system 106 may determine inter-block relationships between groups of two or more blocks 124 based on access patterns that are exhibited in the access data 110.

It is to be appreciated that, in some embodiments, the block-dependency data 116 may be user-specific. That is, for the same video game and the same client system configuration, a first map of block dependencies may be determined for a first user 102 and a second map of block dependencies may be determined for a second user 102, the second map different than the first map. This may be based on the unique access patterns exhibited in user-specific access data 110.

At 512, the remote system 106 may send the block-dependency data 116 to one or more client machines 104. The block-dependency data 116 may be sent in response to various trigger events. For example, the remote system 106 may send block-dependency data 116 for a video game to a client machine 104 in response to a user 102 of the client machine 104 having acquired (e.g., purchased, rented, leased, etc.) the video game. As another example, the block-dependency data 116 generated at block 506 may represent new data (or updated data) relative to previous version of block-dependency data 116 for the video game, and, in response to generating the new/updated block-dependency data 116 at block 506, the remote system 106 may send the block-dependency data 116 to client machines 104 known to be associated with owners of the video game. As yet another example, a user may opt-in to having a local prefetching feature implemented on his/her client machine 104, and in response to opting-in, the remote system 106 may send the block-dependency data 116 to the client machine 104 of the opted-in user.

Figure 6:
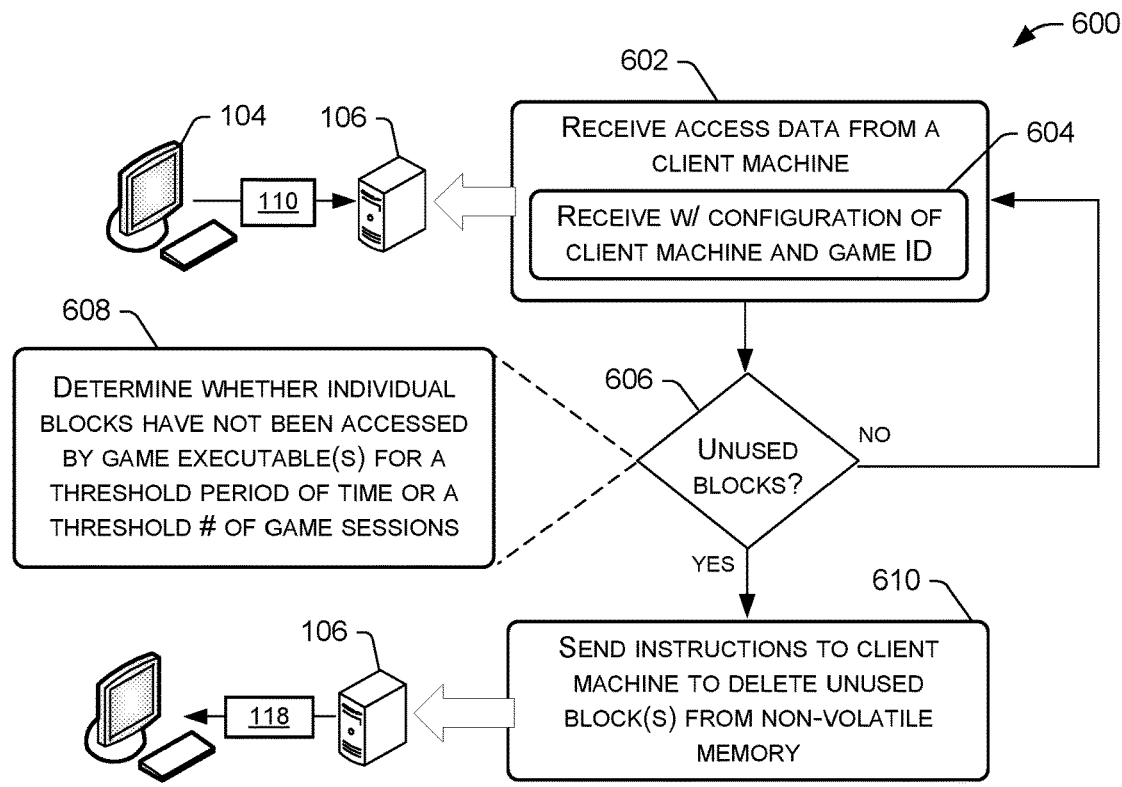
FIG. 6 is a flow diagram of an example process for determining, based on access data received from a client machine, unused blocks of game data, and instructing the client machine to discard the unused blocks of game data.

FIG. 6 is a flow diagram of an example process 600 for determining, based on access data 110 received from a client machine 104, unused blocks 124 of game data 126, and instructing the client machine 104 to discard the unused blocks 124 of game data 126.

At 602, the remote system 106 may receive, from a client machine 104, access data 110 associated a video game. The access data 110 received at block 602 may specify: (i) accessed blocks 124 of game data 126 associated with the video game that were accessed by a game executable 122 of the video game during execution of the game executable 122 on the client machine 104, and (ii) times, during the execution of the game executable 122, at which the accessed blocks 124 of the game data 126 were accessed by the game executable 122. It is to be appreciated that the remote system 106 may have previously received access data 110 at some time(s) in the past from the same client machine 104. Accordingly, the remote system 106 may have access to access data 110 generated over multiple game sessions played on the client machine 104. As shown by sub-block 604, the access data 110 may be received along with a configuration of the client machine 104 that sent the access data 110, and/or a game identifier of a video game that executed on the client machine 104 when the access data 110 was generated.

At 606, the remote system 106 may determine, based on the access data 110 (and possibly additional access data 110 received from the client machine 104 in the past), whether any blocks 124 of the game data 126 for the video game that are presently stored in non-volatile memory (e.g., the first memory 132(1)) of the client machine 104 can be classified as "unused" blocks 124 of game data 126. As shown by sub-block 608, this determination may include determining whether individual blocks 124 have not been accessed by a game executable(s) 122 of the video game on the client machine 104 for a threshold period of time, or for a threshold number of game sessions. For example, if blocks X-Z of game data 126 have not been accessed for the past P game sessions ("P" being any suitable integer), or for the last Q weeks ("Q" being any suitable integer, such as the last 10 weeks), the determination may be that blocks X-Z are unused blocks.

In some embodiments, other factors are considered in classifying blocks 124 of game data 126 as unused blocks. For example, the remote system 106 may determine, across N users of a particular video game, that certain blocks 124 of game data 126 are accessed by the game executable 122 once and never again accessed afterwards, the remote system 106 may determine that particular blocks 124 have been already accessed once, and, if so, may designate the block(s) 124 as unused, regardless of how recently the block(s) 124 was/were accessed by the game executable 122. Other heuristics can be used to determine unused blocks 124 as well.

If the determination at block 606 is that none of the blocks 124 of game data 126 stored in non-volatile memory (e.g., the first memory 132(1)) of the client machine 104 can be classified as unused blocks 124, the process 600 may follow the "NO" route from block 606 back to block 602 where the remote system 106 may receive (or wait to receive) additional access data 110 from the client machine 104. If the determination at block 606 is that one or more blocks 124 of game data 126 stored in non-volatile memory of the client machine 104 can be classified as unused blocks 124, the process 600 may follow the "YES" route from block 606 to block 610.

At 610, the remote system 106 may send, to the client machine 104, instructions 118 to delete the unused block(s) 124 of game data 126 from non-volatile memory of the client machine 104. These instructions 118 may include the identifiers of the to-be-deleted blocks 124. Once deleted, the local memory resources 132 of the client machine 104 can be freed up to increase local memory capacity and potentially store other data thereon.

Figure 7:
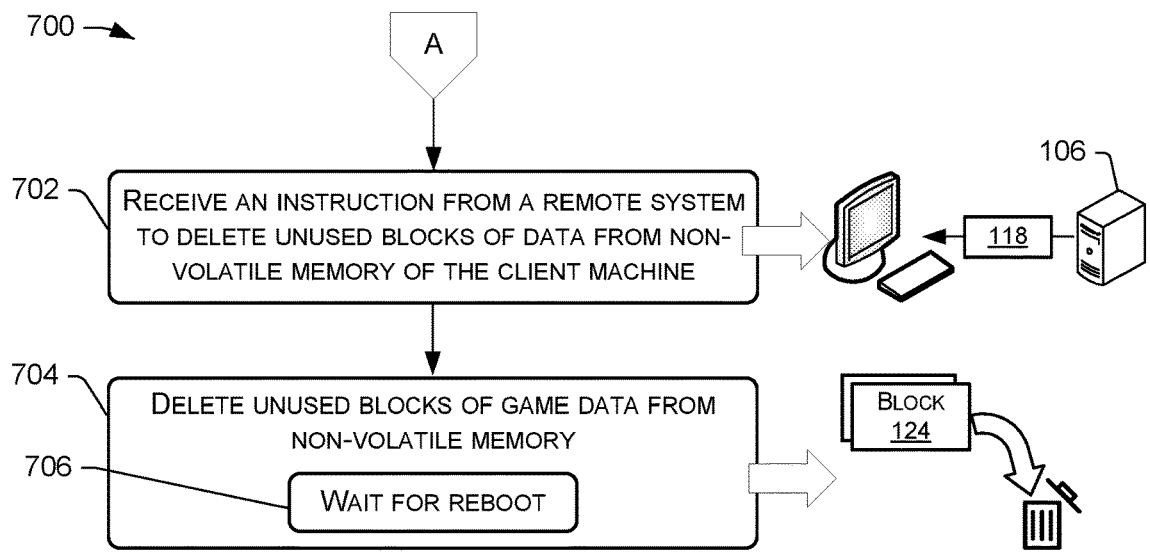
FIG. 7 is a flow diagram of an example process for discarding unused blocks of game data from non-volatile memory of a client machine.

FIG. 7 is a flow diagram of an example process 700 for discarding unused blocks of game data from non-volatile memory of a client machine 104. As shown by the off-page reference "A" in FIGS. 2 and 7, the process 700 may continue from block 224 of the process 200, after the client machine 104 has sent access data 110 to the remote system 106.

At 702, the client machine 104 may receive, from the remote system 106, an instruction 118 to delete, from the non-volatile memory, one or more blocks 124 of game data 126 for a video game. The remote system 106 may have determined, from the access data 110 previously sent by the client machine, that the to-be-deleted block(s) 124 represent unused blocks 124 of the game data 126 that have not been accessed for a threshold period of time or a threshold number of game sessions.

At 704, the client machine 104 may delete, from the non-volatile memory (e.g., first memory 132(1)), the one or more blocks 124 of the game data 126 based on the instruction 118 received from the remote system 106. As shown by sub-block 706, the client machine 104 may be configured to wait until the client machine 104 is rebooted before discarding the block(s) 124 of game data 126. In this manner, deleting the block(s) 124 does not cause any issues if, for example, the user 102 is currently playing the video game (or a different video game). It is to be appreciated that remaining blocks 124 of game data 126 remain persisted in non-volatile memory after the deletion of the unused blocks 124. Accordingly, local memory resources 132 may be freed up by discarding blocks 124 of game data 126 that are unlikely to be accessed in the future. In an example use case, a user 102 may have installed Video Game X on his/her client machine 104, and since doing so, the user 102 has only ever played Video Game X online, meaning that the user 102 has never played Video Game X in single player mode. From the access data 110 reported by the client machine 104 to the remote system 106, the remote system 106 may determine, since Video Game X was installed on the client machine 104, and over a number of weeks and/or a number of game sessions, the user 102 has never accessed the blocks 124 of game data 126 for the single player mode of Video Game X. In this case, the remote system 104 may send, and the client machine 104 may receive, an instruction 118 to discard the single player game data 126 (by identifying one or more blocks 124 that correspond to this game data 126), and the client machine 104 may delete these blocks 124 to free up space in the non-volatile memory (e.g., the first memory 132(1)) of the client machine 104.

After deletion, the video game may execute as normal, and the read operations made by the game executable 122 continue to be made. In the off-chance that the game executable 122 requests to read blocks 124 of game data 126 that have been deleted from non-volatile memory of the client machine 104, the file system proxy component 218 may retrieve those blocks from the remote system 106 on-demand. In some embodiments, if deleted blocks 124 are requested to be read by the game executable 122, those blocks 124 may be re-downloaded to the non-volatile memory of the client machine 104. Implementation of the process 700, along with other processes and/or techniques described herein, can reclaim valuable disk space on a client machine 104 (e.g., on the order of tens of Gigabytes of disk space).

Figure 8:
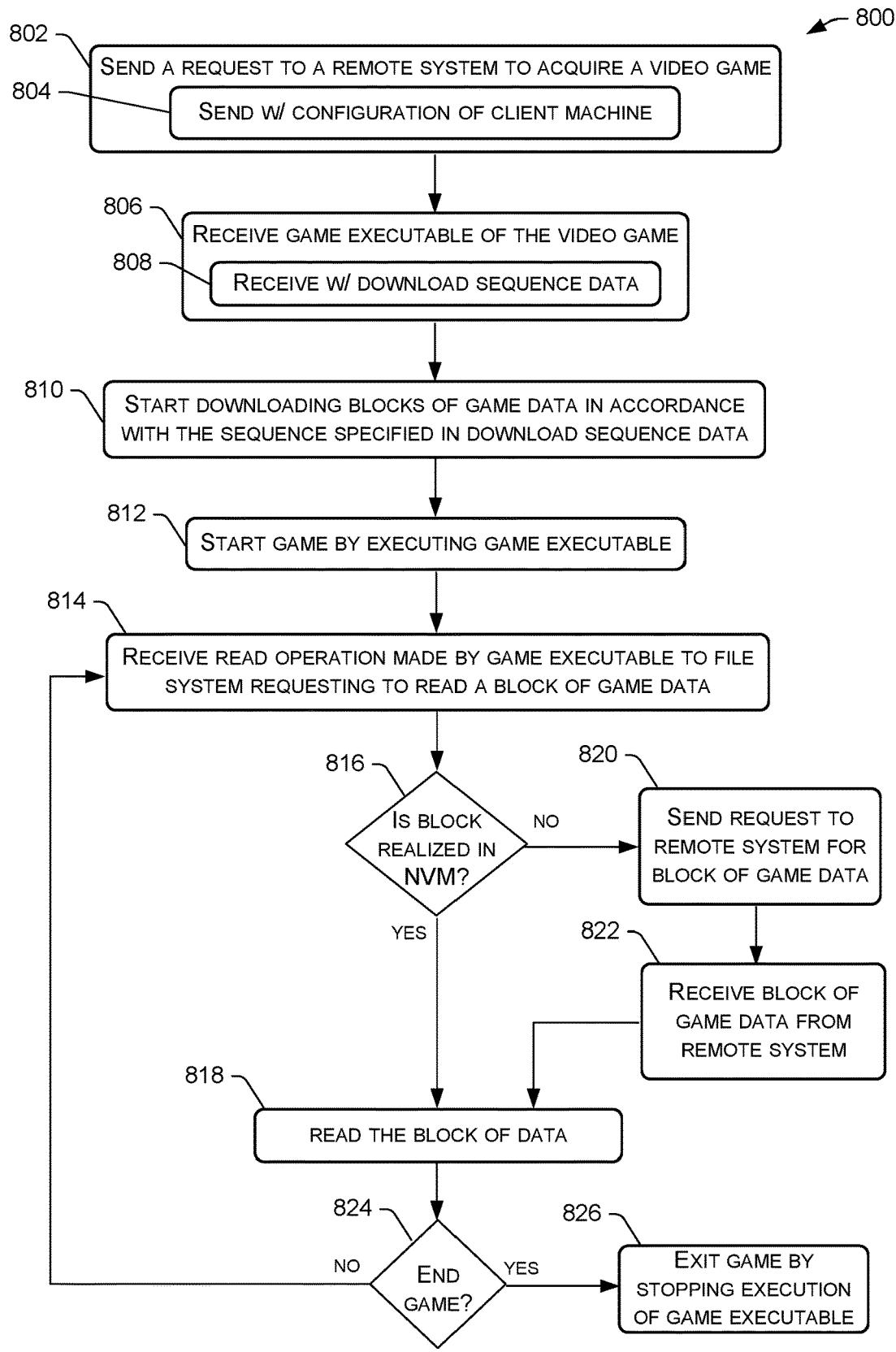
FIG. 8 is a flow diagram of an example process for executing a video game on a client machine before the game download is finished.

FIG. 8 is a flow diagram of an example process 800 for executing a video game on a client machine 104 before the game download is finished. This is sometimes referred to herein as an "instant play" 128 feature because the process 800 may allow a user 102 to play a video game upon acquisition of the video game, without waiting for game data 126 to be downloaded to the client machine 104.

At 802, a client machine 104 may send a request 120 to a remote system 106 to acquire (e.g., purchase, rent, lease, etc.) a video game. As shown by sub-block 804, the request 120 may include a configuration of the client machine 104 so that the remote system 106 retrieves the correct download-sequence data 114 for the client system configuration.

At 806, the client machine 104 may receive, from the remote system 106, a game executable(s) 122 of the video game, such as executable code (e.g., one or more files) that is executable by the processor(s) 202 of the client machine 104 to play the video game thereon. As shown by sub-block 808, the client machine 104 may also receive download-sequence data 114 associated with the configuration of the client machine 104. This download-sequence data 114 may specify a sequence of blocks 124 of game data 126 for the video game.

At 810, the client machine 104 may start downloading, to non-volatile memory (e.g., first memory 132(1)) of the client machine 104, the blocks 124 of the game data 126 for the video game in accordance with the sequence specified in the download-sequence data 114.

At 812, the client machine 104 may execute the game executable 122 to start the video game. It is to be appreciated that the user 102 may start playing the video game, and the game executable 122 may start executing even before the first block 124 of game data 126 is finished downloading. Execution of the game executable may occur in response to user input detected by the client machine 104 to start the video game. For example, the user of the client machine 104 may select a user interface element of the video game client 212 to start the video game that the user has just acquired via the remote system 106. As mentioned, in some embodiments, the remote system 106 may send data to the client machine 104 for outputting a recommendation to the user 102 via the client machine 104, such as by displaying a recommendation that states "For the best user experience, we recommend waiting T minutes after starting the download to play [Video Game X]". In some embodiments, the video game client 212 may prevent execution of the game executable 122 until after a threshold period of time has lapsed, and/or until after a threshold number of blocks 124 have finished downloading to provide an optimal user experience. Alternatively, if the video game is particularly well-suited for the instant play 128 feature, the remote system 106 may instruct the client machine 104 to output a notification that states "This game is ready for instant play, so you can start playing right now. Enjoy!", and/or the video game client 212 may not place any restrictions on when the user 102 can start playing the video game. In fact, it might be preferable for some players who aren't bothered by a little bit of latency in the beginning of a video game (e.g., when exploring a world and setting things up) to start playing immediately, and possibly before any game data 126 has finished downloading.

At 814, the file system proxy component 218 of the client machine 104 may receive a first read operation made by the game executable 122 to a file system 220 of the client machine 104. This first read operation may request to read a first block 124(1) of the game data 126 for the video game. Because the download of the game data 126 is in-progress at the time the read operation(s) is received at block 814 (assuming a significantly large video game), there is a potential for the game executable 122 to request to read an unrealized block 124 of game data 126, "unrealized" meaning that the block 124 of game data has not yet been downloaded to non-volatile memory (e.g., first memory 132(1)) of the client machine 104. In some embodiments, the file system proxy component 218 may temporarily (e.g., briefly) block the read operation to make a determination as to whether the requested block(s) 124 is realized in non-volatile memory, or if the block(s) 124 still needs to be downloaded (e.g., to finish downloading).

Accordingly, at 816, the file system proxy component 218 may determine whether the first block 124(1) of the game data 126 has been downloaded to the non-volatile memory (NVM) of the client machine 104 (i.e., if the first block 124(1) has been "realized" in non-volatile memory). If the first block 124(1) of the game data 126 is realized in non-volatile memory of the client machine 104 at a time of receiving the read operation at block 814, the process 800 may follow the "YES" route from block 816 to block 818.

At 718, the file system proxy component 218 of the client machine 104 may unblock the read operation and the file system 220 may be used to read the first block 124(1) of the game data 126 from a local memory resource 132. If, by chance, the first block 124(1) is realized and was prefetched by caching it in the second memory 132(2) or the third memory 132(3) that provides faster read access speed than the first memory 132(1), then the first block 124(1) may be read from the faster memory 132(2)/(3) where it is cached. If, at block 816, the first block 124(1) of game data 126 is not realized in non-volatile memory of the client machine 104, meaning that the first block 124(1) has not finished downloading to the non-volatile memory (e.g., the first memory 132(1)), the process 800 may follow the "NO" route from block 816 to block 820.

At 820, the client machine 104 may send, to the remote system 106, a second request for the first block 124(1) of the game data 126. As mentioned, the file system proxy component 218 may intercept and block the read operation. In some embodiments, the call associated with the read operation may be intercepted and blocked within the Kernel of the client machine 104, and the file system proxy component 218 may make a callback into the video game client 212 to download the first block 124(1) if it determines that the first block 124(1) is unrealized.

At 822, the client machine 104 may receive the first block 124(1) of the game data 126 from the remote system 106 over the computer network 108. Following the receipt of the first block 124(1) of game data 126, the first block 124(1) of the game data 126 may be read using the file system 220. Thus, the file system proxy component 218 may temporarily block read operations, at least for unrealized blocks 124 of game data 126 until those blocks 124 are received from the remote system 106. Although this may add latency in reading an unrealized block 124, as compared to the latency of reading a block 124 that is already realized in non-volatile memory of the client machine 104, this configuration nevertheless allows the video game to be played without having downloaded all of the game data 126 for the video game. In fact, it allows the video game to be played without any game data 126 being stored on the client machine 104. However, since latency is added by retrieving blocks 124 of game data 126 over the computer network 108, the act of downloading the game data 126 in parallel with game execution ensures that at least some, if not all, of the blocks 124 of game data 126 will be realized in non-volatile memory by the time the game executable 122 requests to read those blocks 124, thereby reducing latency. That is, because the remote system 106 intelligently determines the download sequence based on the access data 110 it received from other client machines 104 with the same client system configuration, the likelihood of receiving a read operation requesting to read an unrealized block 124 of game data 126 is relatively low, and it is not expected to occur frequently, if at all. Instead, by the time a read operation for a given block 124 is made by the game executable 122, it is likely that the given block 124 will have already been downloaded and realized in non-volatile memory such that the game executable 122 can read the block 124 from a local memory resource 132 of the client machine 104 with less latency than the latency involved in retrieving the same block 124 from the remote system 106 over the computer network 108

At 824, a determination is made as to whether the game session for the video game should be terminated. For example, if the user 102 quits the video game, the process 800 may follow the "YES" route from block 824 to block 826 where the video game client 212 may stop execution of the game executable 122. If, at block 824, the game session should not be terminated (e.g., if the user 102 continues playing the game), the process 800 may follow the "NO" route from block 824 to block 814 where an additional read operation may be received. A portion of the process 800 may iterate in this manner as the user 102 continues playing the game, with unrealized blocks 124 of game data 126 being retrieved from the remote system 106 on-demand, if necessary. Using this approach where the file system proxy component 218 "lies" to the video game about the blocks 124 available in non-volatile memory, it can be appreciated that, from the frame of reference of the video game, it looks like the contents of the game are stored in the first memory 132(1). The video game may expect that the game data 126 is available from a local memory resource 132, and it may be accustomed to variable read access speeds from client machine 104 to client system 104, or there may be variability in read access speed on a single client machine 104 based on various factors (e.g., resources consumed by other running processes, etc.). This all means that the approach of the process 800 will not cause the video game to crash despite possibly being a little slow, at times, to retrieve unrealized blocks 124 of game data 124 over a wide area network 108.

Using the process 800, a user 102 can start playing a video game as soon as he/she wants to after acquiring the game.

Furthermore, the technique of the process 800 is game agnostic, meaning that a game developer doesn't need to do any work to allow for the instant play 128 feature; rather, it is a value add for all games on a video game distribution platform that distributes video games to a heterogenous population of client system configurations.

Figure 9:
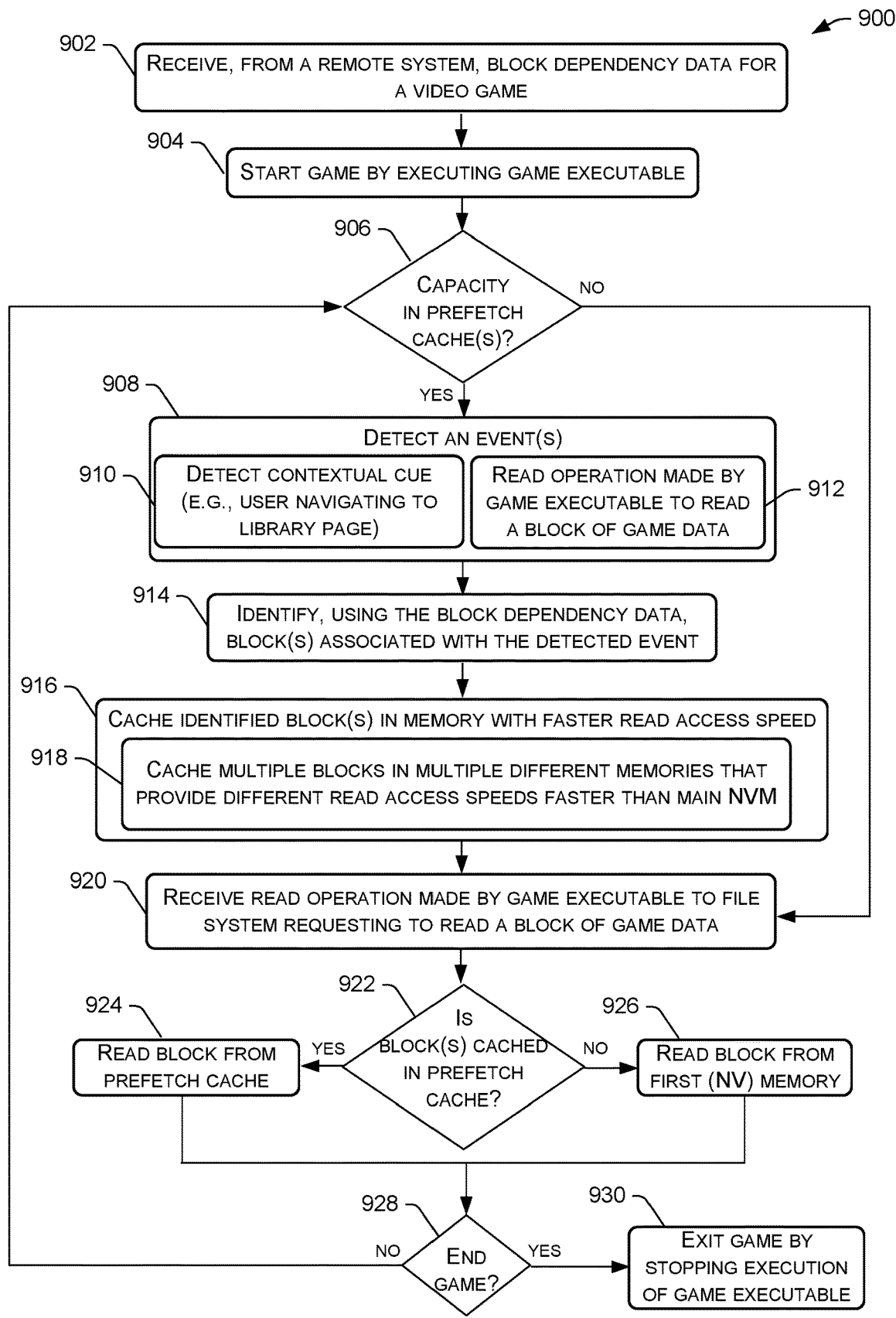
FIG. 9 is a flow diagram of an example process for prefetching blocks of game data to reduce latency during gameplay.

FIG. 9 is a flow diagram of an example process 900 for prefetching blocks 124 of game data 126 to reduce latency during gameplay.

At 902, a client machine 104 may receive, from a remote system 106, block-dependency data 116 associated with a configuration of the client machine 104. This block-dependency data 116 may specify individual associations between two or more blocks 124 of game data 126 for a video game.

At 904, the client machine 104 may execute a game executable 122 of the video game to start the video game on the client machine 104. The game executable 122 may already be available on the client machine 104 due to the video game being installed on the client machine 104. Execution of the game executable 122 allows a user 102 of the client machine 104 to start playing the game. Furthermore, execution of the game executable 122 may occur in response to user input detected by the client machine 104 to start the video game. For example, the user 102 of the client machine 104 may select a user interface element of the video game client 212 to start the video game.

At 906, a determination may be made as to whether there is an above-threshold amount of capacity in "prefetch cache". "Prefetch cache," as used herein, means the cache allocated (or reserved) for prefetched blocks 124 of game data 126. As described herein, the second memory 132(2) and/or the third memory 132(3)—which provide faster read access speeds than the first memory 132(1)—may provide the prefetch cache, and the prefetch cache on either or both local memory 132(2)/(3) can be set to any suitable amount of data, such as 100 Megabytes. In this example, as much as 100 Megabytes of game data 126 can be prefetched during a game session, before the game executable 122 requests to read that prefetched game data 126. 100 Megabytes is merely an example, and the prefetch cache can be set to a lesser or greater amount of data. Accordingly, at block 906, the prefetch cache(s) can be monitored to determine how full the prefetch cache(s) is/are, and if the cache capacity meets or exceeds a threshold amount, additional prefetching of game data 126 can be triggered. This threshold amount of capacity in the prefetch cache(s) that is evaluated at block 906 may be set to any suitable amount. If the size of an individual block 124 of game data 126 is 4096 bytes, for example, the threshold amount of capacity may be set to as few as 4096 bytes of capacity, which is enough room to prefetch a block 124 of game data 126. However, the threshold amount of capacity may be set to a higher number of bytes/Megabytes to ensure that multiple blocks 124 can be prefetched during a run through the prefetch algorithm.

In an example use case, use case, a user 102 of the client machine 104 may have navigated to the game's library page, and a set of blocks 124 of game data 126 may have been prefetched to fill 100 Megabytes of prefetch cache in the second memory 132(2) and/or the third memory 132(3) of the client machine 104. As the user 102 continues to play the video game, the file system 220 may receive calls associated with read operations made by the game executable 122 to read one or more of the prefetched blocks 124. Instead of accessing the first memory 132(1) of the client machine 104 to retrieve those blocks 124, the file system 220 may access at least one of the second memory 132(2) or the third memory 132(3) where the prefetched blocks 132 are cached, and, as a result, the capacity in the prefetch cache(s) starts to increase. Once this capacity in the prefetch cache(s) meets or exceeds a threshold, additional prefetching may be triggered to fill the prefetch cache(s). Accordingly, if there is an above-threshold amount of capacity in the prefetch cache(s) at block 906, the process 900 may follow the "YES" route from block 906 to block 908.

At 908, logic of the client machine 104 may detect an event(s) that is used to determine what block(s) 124 of game data 126 to prefetch. For example, at sub-block 910, the event detected might be a contextual cue (e.g., a user navigating to a library page of the video game). As another example, at sub-block 912, the event detected might be the file system proxy component 218 receiving a read operation made by the game executable 122 to read a particular block 124 of game data 126.

At 914, the logic of the client machine 104 may identify, using the block-dependency data 116, one or more blocks 124 of game data 126 that are associated with the detected event. For example, if the event detected at block 908 is that the game executable 122 requested to read Block A of game data 126, and if the block-dependency data 116 indicates that Block B is likely to be accessed by the game executable 122 within a threshold period of time from the accessing of Block A, the logic may identify Block B at block 914.

At 916, the identified block(s) 124 may be cached in local memory 132 that provides a faster read access speed than the first memory 132(1) (e.g., non-volatile memory, such as a HDD, a SD card, etc.) where the game data 126 is persisted on the client machine 104. Accordingly, the identified block (s) 124 can be cached in at least one of the second memory 132(2) (e.g., additional non-volatile memory, such as a SSD) or the third memory 132(3) (e.g., volatile, working memory, such as RAM). As shown by sub-block 918, if multiple blocks 124 of game data 126 are identified at 914, the blocks 124 can be cached in multiple different prefetch caches, such as by caching a second block 124(2) in second memory 132(2) and caching a third block 124(3) in third memory 132(3), and so on and so forth. In this manner, prefetched blocks 124 of game data 126 can be distributed across multiple prefetch caches of multiple local memory resources 132 using a load balancing technique where some game data 126 is cached in the second memory 132(2) and a roughly equal amount of game data 126 is cached in the third memory 132(3), notwithstanding the third memory 132(3) providing a faster read access speed than the second memory 132(2). In this manner, prefetched game data 126 can be load balanced to improve the overall throughput of the system in that game data 126 can be accessed from any and all local memory resources 132 in parallel during game play. It may be the case that 1% of read operations are predicted to access game data 126 from the first memory 132(1), 9% of read operations are predicted to access game data 126 from the second memory 132(2), and 90% of the read operations are predicted to access game data 126 from the third memory 132(3) in this load balancing scheme.

At 920, the file system proxy component 218 of the client machine 104 may receive a read operation made by the game executable 122 to the file system 220, the read operation requesting to read a particular block 124 of game data 126 for the video game.

At 922, a determination may be made (e.g., by the file system 220) as to whether the requested block 124 is cached in the prefetch cache of a local memory resource (e.g., the second memory 132(2) or the third memory 132(3)) that provides relatively fast read access speed. If the block 124 is cached in prefetch cache, the process 900 may follow the "YES" route from block 922 to block 924 where the block 124 may be read from the prefetch cache. For example, the game executable 122 may read the block 124 of the game data 126 from the second memory 132(2) or the third memory 132(3), depending on where the block 124 is cached. If the block 124 is not cached in prefetch cache, the process 900 may follow the "NO" route from block 922 to block 926 where the block 124 may be read from the first memory 132(1) where the game data 126 can be persisted on the client machine 104.

At 928, a determination is made as to whether the game session for the video game should be terminated. For example, if the user 102 quits the video game, the process 900 may follow the "YES" route from block 928 to block 930 where the video game client 212 may stop execution of the game executable. In some embodiments, if the user 102 a game session and reboots the client machine 104, the game data 126 that was prefetched into the second memory 132(2) may still be stored in the prefetch cache of the second memory 132(2) upon reboot if the second memory 132(2) represents additional non-volatile memory (e.g., a SSD). In this manner, if the user 102 starts another game session after reboot, blocks 124 of game data 126 that are still cached in the second memory 132(2) can be retrieved therefrom, if and when they are requested by the game executable 122 during the subsequent game session. If, at block 928, the game session should not be terminated (e.g., if the user 102 continues playing the game), the process 900 may follow the "NO" route from block 928 to block 906 where capacity of the prefetch cache(s) is evaluated again to iterate a portion of the process 900 starting from block 906. At 906, if there is not an above-threshold amount of capacity in the prefetch cache(s) (e.g., if the prefetch cache(s) is/are considered to be too full of prefetched game data 126), the process 900 may follow the "NO" route from block 906 directly to block 920 where a read operation is received by the file system proxy component 218 without prefetching game data 126 in the prefetch cache(s).

The process 900 can decrease the loading times during game execution by reducing the overall latency as compared to accessing the game data 126 exclusively from the first memory 132(1) where the game data 126 is persisted on the client machine 104. In this manner, a relatively large video game can be stored in the first memory 132(1) (e.g., a HDD, a SD card, etc.), yet, because game data 126 may be intelligently prefetched by caching blocks 124 of game data 126 in the third memory 132(2) (e.g., working, non-volatile memory, such as RAM) and/or in the second memory 132(2) (e.g., SSD) ahead of a time when those block 124 are requested by the game executable 122, by the time the game executable 122 requests to read those blocks 124 of game data 126, the blocks 124 are likely to have already been cached in prefetch cache to reduce the read access time.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
    sending, by a computing device, to a remote system, a request to acquire a program;
    receiving, by the computing device, from the remote system, executable code of the program;
    starting to download, by the computing device, to non-volatile memory of the computing device, blocks of data for the program;
    preventing, by a processor of the computing device, execution of the executable code until at least one of:
        a lapse of a period of time since the blocks started to download; or
        an occurrence of an event, and
    in response to at least one of the lapse of the period of time or the occurrence of the event, executing, by the processor, the executable code on the computing device while at least some of the blocks are still being downloaded.

2. The method of claim 1, further comprising receiving, by the computing device, from the remote system, download-sequence data specifying a sequence of the blocks, wherein the blocks start to download in accordance with the sequence.

3. The method of claim 2, wherein:
    the request includes a configuration of the computing device; and
    the download-sequence data is associated with the configuration.

4. The method of claim 1, further comprising:
    receiving, by the processor, a read operation made by the executable code to a file system of the computing device, the read operation requesting to read a block of the blocks;
    determining, by the processor, that the block has been downloaded to the non-volatile memory; and
    reading, by the processor, the block using the file system.

5. The method of claim 1, wherein the event occurs when a threshold number of the blocks have been downloaded to the non-volatile memory.

6. The method of claim 1, wherein the program comprises a video game, the method further comprising outputting, by the computing device, a notification indicating that the video game is ready for instant play.

7. A computing device comprising:
    a processor; and
    non-transitory computer-readable media storing computer-executable instructions that, when executed by the processor, cause the computing device to:
        send, to a remote system, a request to acquire a program;
        receive, from the remote system, executable code of the program;
        start to download, to non-volatile memory of the computing device, blocks of data for the program;
        prevent, using the processor, execution of the executable code until at least one of:
            a lapse of a period of time since the blocks started to download; or
            an occurrence of an event, and
        in response to at least one of the lapse of the period of time or the occurrence of the event, execute, using the processor, the executable code on the computing device while at least some of the blocks are still being downloaded.

8. The computing device of claim 7, wherein the computer-executable instructions, when executed by the processor, further cause the computing device to receive, from the remote system, download-sequence data specifying a sequence of the blocks, wherein the blocks start to download in accordance with the sequence.

9. The computing device of claim 8, wherein the sequence positions the blocks that are more likely to be accessed first towards a start of the sequence, and the blocks that are less likely to be accessed first towards an end of the sequence.

10. The computing device of claim 7, wherein the computer-executable instructions, when executed by the processor, further cause the computing device to:
receive, via the processor, a read operation made by the executable code to a file system of the computing device, the read operation requesting to read a block of the blocks;
determine, using the processor, that the block has not finished downloading to the non-volatile memory;
send, to the remote system, a second request for the block;
receive the block from the remote system; and
read the block using the file system.

11. The computing device of claim 7, wherein the computer-executable instructions, when executed by the processor, further cause the computing device to receive, from the remote system, instructions to wait for at least one of the lapse of the period of time or the occurrence of the event before allowing the execution of the executable code, wherein preventing the execution of the executable code is based at least in part on receiving the instructions from the remote system.

12. The computing device of claim 7, wherein the program comprises a video game, and the computer-executable instructions, when executed by the processor, further cause the computing device to output a notification indicating that the video game is ready for instant play.

13. The computing device of claim 7, wherein the event occurs when a threshold number of the blocks have been downloaded to the non-volatile memory.

14. The computing device of claim 7, wherein the computer-executable instructions, when executed by the processor, further cause the computing device to:
receive, via the processor, a read operation made by the executable code to a file system of the computing device, the read operation requesting to read a block of the blocks;
determine, using the processor, that the block has been downloaded to the non-volatile memory; and
read the block using the file system.

15. One or more non-transitory computer-readable media storing computer-executable instructions that, when executed by processor of a computing device, cause the computing device to:
send, to a remote system, a request to acquire a program;
receive, from the remote system, executable code of the program;
start to download, to non-volatile memory of the computing device, blocks of data for the program;
prevent, using the processor, execution of the executable code until at least one of:
a lapse of a period of time since the blocks started to download; or
an occurrence of an event, and
in response to at least one of the lapse of the period of time or the occurrence of the event, execute, using the processor, the executable code on the computing device while at least some of the blocks are still being downloaded.

16. The one or more non-transitory computer-readable media of claim 15, wherein the computer-executable instructions, when executed by the processor, further cause the computing device to receive, from the remote system, download-sequence data specifying a sequence of the blocks, wherein the blocks start to download in accordance with the sequence.

17. The one or more non-transitory computer-readable media of claim 16, wherein the sequence is specific to a user of the computing device based at least in part on unique access patterns exhibited in access data associated with the user.

18. The one or more non-transitory computer-readable media of claim 15, wherein the program comprises a video game, and the computer-executable instructions, when executed by the processor, further cause the computing device to display a recommendation to wait for the period of time, or a different period of time, after starting to download the blocks to play the video game.

19. The one or more non-transitory computer-readable media of claim 15, wherein the program comprises a video game, and the computer-executable instructions, when executed by the processor, further cause the computing device to output a notification indicating that the video game is ready for instant play.

20. The one or more non-transitory computer-readable media of claim 15, wherein the event occurs when a threshold number of the blocks have been downloaded to the non-volatile memory.

* * * * *